(12) United States Patent
Kitani

(10) Patent No.: US 9,128,311 B2
(45) Date of Patent: Sep. 8, 2015

(54) LIQUID CRYSTAL DISPLAY DEVICE

(71) Applicant: Japan Display Inc., Minato-ku (JP)

(72) Inventor: Masakatsu Kitani, Saitama-ken (JP)

(73) Assignee: Japan Display Inc., Minato-ku (JP)

( * ) Notice: Subject to any disclaimer, the term of this patent is extended or adjusted under 35 U.S.C. 154(b) by 85 days.

(21) Appl. No.: 14/040,860

(22) Filed: Sep. 30, 2013

(65) Prior Publication Data

US 2014/0098312 A1    Apr. 10, 2014

(30) Foreign Application Priority Data

Oct. 4, 2012 (JP) ................................ 2012-222061

(51) Int. Cl.
*G02F 1/1343* (2006.01)
*G02F 1/133* (2006.01)
*G09G 3/36* (2006.01)

(52) U.S. Cl.
CPC .......... *G02F 1/13306* (2013.01); *G09G 3/3614* (2013.01); *G09G 3/3648* (2013.01); *G09G 2300/0426* (2013.01); *G09G 2300/0439* (2013.01)

(58) Field of Classification Search
CPC ................ G02F 1/136286; G02F 2001/13606; G02F 1/13306; G09G 3/3614; H01L 27/124
USPC ....................... 349/41, 37, 139; 345/209, 204
See application file for complete search history.

(56) References Cited

U.S. PATENT DOCUMENTS

| | | | | |
|---|---|---|---|---|
| 6,717,630 | B1 * | 4/2004 | Ikeda | 349/43 |
| 7,646,439 | B1 * | 1/2010 | Choi et al. | 349/27 |
| 2002/0079501 | A1 * | 6/2002 | Okada et al. | 257/88 |
| 2004/0252249 | A1 * | 12/2004 | Hong | 349/37 |
| 2005/0140893 | A1 * | 6/2005 | Hong | 349/139 |
| 2006/0139543 | A1 * | 6/2006 | Kim et al. | 349/141 |
| 2007/0132900 | A1 * | 6/2007 | Lee | 349/38 |
| 2007/0152220 | A1 * | 7/2007 | Kwack | 257/59 |
| 2007/0187686 | A1 * | 8/2007 | Liu | 257/72 |
| 2007/0236414 | A1 * | 10/2007 | Lin | 345/60 |
| 2008/0297675 | A1 * | 12/2008 | Kim | 349/38 |

FOREIGN PATENT DOCUMENTS

JP    4-223428    8/1992

* cited by examiner

*Primary Examiner* — Sang V Nguyen
(74) *Attorney, Agent, or Firm* — Oblon, McClelland, Maier & Neustadt, L.L.P.

(57) ABSTRACT

A liquid crystal display device using a pseudo-dot inversion driving system includes a pixel circuit arranged in a matrix shape in a row direction and a column direction. First and second gate lines extend in the row direction. First and second signal lines extend in the column direction. The pixel circuit includes a pixel electrode arranged between the first and second signal lines and electrically connected with the first signal line through a switching element. Parasitic capacitance formed between the pixel electrode and the first signal line is smaller than the parasitic capacitance between the pixel electrode and the second signal line.

4 Claims, 21 Drawing Sheets

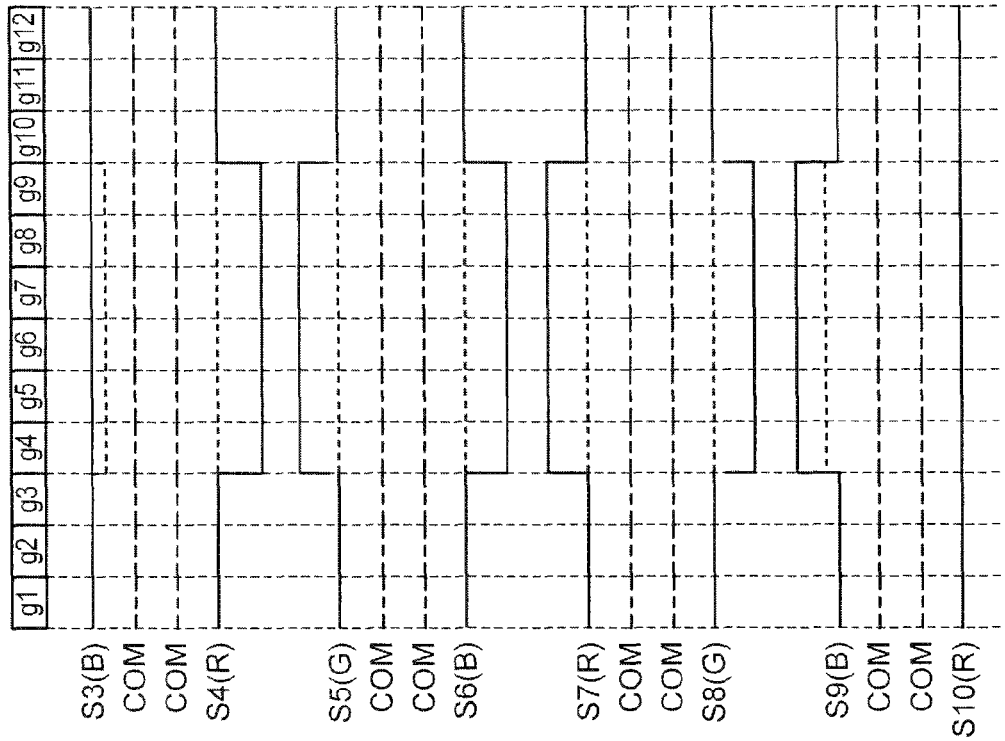
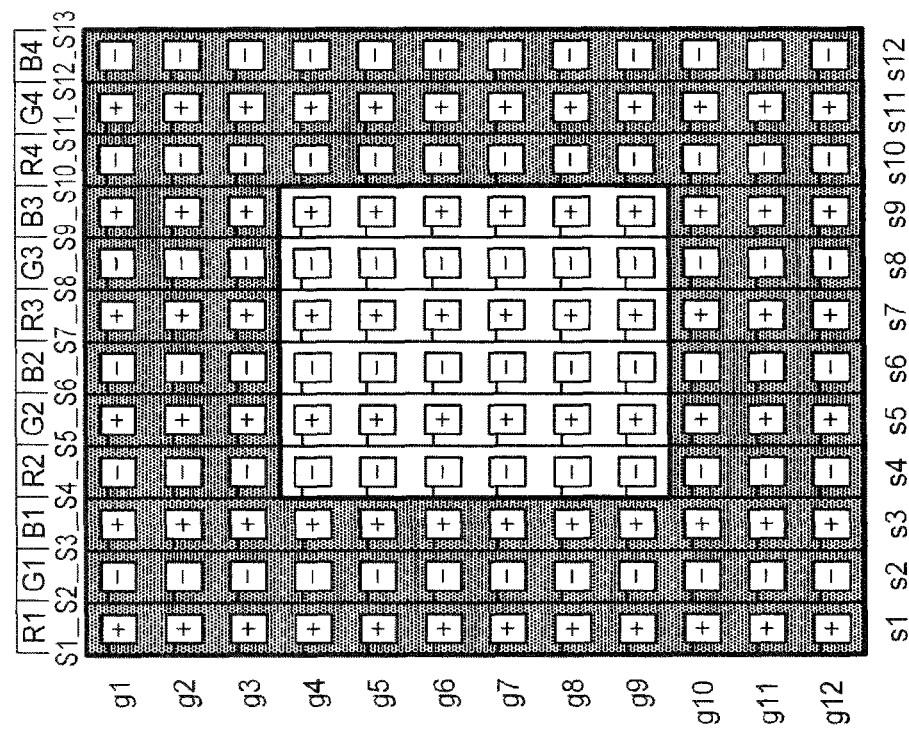
FIG. 5A
FIG. 5B

LIQUID CRYSTAL DISPLAY DEVICE

CROSS-REFERENCE TO RELATED APPLICATION

This application is based upon and claims the benefit of priority from prior Japanese Patent Application No. 2012-222061 filed Oct. 4, 2012, the entire contents of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and PDA (personal digital assistant), a car navigation equipment, and a game machine.

By the way, in a liquid crystal display device, voltage is applied to upper and lower sides of a liquid crystal layer, for example, to change transmissivity by changing alignment state of liquid crystal molecules. Thereby, images are displayed. However, when the direct-current driving in which polarity of the applied voltage is not changed is adopted, since electric distribution changes by existence of ion impurities in the liquid crystal layer, etc., display grace of the images falls. Therefore, it is common to adopt an alternating current driving system which inverts polarity of the applied voltage every predetermined interval.

As the AC driving system, a frame inversion driving system, a column (image signal line) inversion driving system, a line (scanning signal line) inversion driving system, a dot inversion driving system, etc., are known. Among the driving systems, since the dot inversion driving system is a system which inverts the polarity of the voltage applied to every adjacent pixel, neither flicker nor cross talk is visible easily. Therefore, the dot inversion driving system has feature that uniform luminance distribution is acquired. However, comparing with other driving systems, there is demerit in which power consumption is large. Therefore, a pseudo-dot inversion driving system is proposed. The pseudo-dot inversion driving system has both features of the column inversion driving system effective in low power consumption, and the dot inversion driving system effective in display grace. That is, the same polarity image signals are applied to the column lines for one frame period, and different polarity images are applied to adjacent pixels, i.e., the dot inversion display is performed as a polarity pattern on the display panel.

When the column inversion driving system is adopted, fall of the display grace, such as vertical cross talk may occur. The vertical cross talk is a phenomenon in which luminance changes in a stripe in regions on upper and lower sides of a window when the window is displayed in a background display.

Since the vertical cross talk remarkably reduces the display grace, it is necessary to prevent the fall of the display grace due to the generation of the vertical cross-talk.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIGS. 5A and 5B are figures showing the generation of the vertical cross talk when parasitic capacitances $Cp1$ and $Cp2$ are equal in the column inversion driving system.

FIG. 8 is a figure showing the display state when the parasitic capacitance $Cp1$ is larger than the parasitic capacitance $Cp2$ in the column inversion driving system.

FIGS. 13A and 13B are figures showing the generation of the vertical cross talk when parasitic capacitances $Cp1$ and $Cp2$ are equal in the pseudo-dot inversion driving system according to the embodiment.

FIGS. 17A and 17B are figures showing the generation of the vertical cross when the parasitic capacitance $Cp1$ is equal to the parasitic capacitance $Cp2$ in a case of displaying color window in the pseudo-dot inversion driving system according to the embodiment.

DETAILED DESCRIPTION

Figure 1:
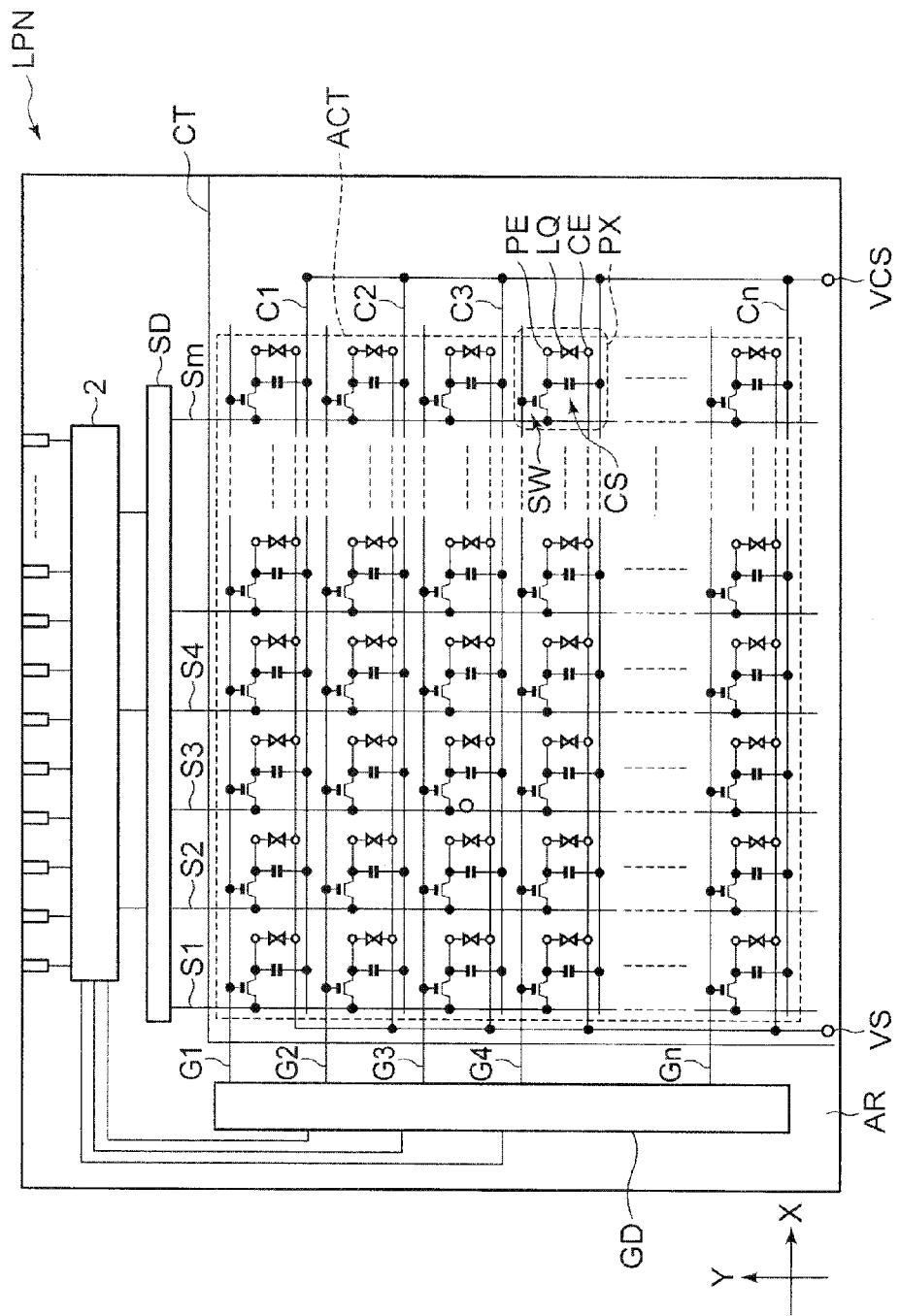
FIG. 1 is a figure schematically showing structure and an equivalent circuit of a liquid crystal display panel LPN which forms the liquid crystal display device using the column inversion drive system.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device using a pseudo-dot inversion driving system comprising: a plurality of pixel circuits arranged in a matrix of row and column and having a pixel electrode, respectively; a first gate line and a second gate line extending in the row direction; a first signal line and a second signal line extending in the column direction; and a switching element connected with the first and second signal lines; wherein the pixel electrode is arranged between the first and second signal lines in a plane seen from a display face and electrically connected with the first signal line through the switching element, and parasitic capacitance formed between the pixel electrode and the first signal line is smaller than the parasitic capacitance between the pixel electrode and the second signal line.

According to other embodiment, a liquid crystal display device using a pseudo-dot inversion driving system comprising: an array substrate, including; an insulating substrate, a plurality of pixels arranged in a matrix of row and column, each pixel including a pixel electrode, a first gate line and a second gate line extending in the row direction; and a first signal line and a second signal line extending in the column direction, a switching element connected with the first and second signal lines, a semiconductor layer formed on the insulating substrate under the first signal line through an insulating film and connected with the switching element, and a counter substrate facing the array substrate; and a liquid crystal layer held between the array substrate and the counter substrate; wherein the pixel electrode is formed on the insulating substrate through an insulating film and arranged in a region surrounded with the first and second gate lines and the first and second signal lines, the pixel electrode is electrically connected with the first signal line through the switching element, first parasitic capacitance is formed between the pixel electrode and the first signal line, second parasitic capacitance is formed between the first signal line and the semiconductor layer, and third parasitic capacitance is formed between the pixel electrode and the second signal line, and the distance between the first signal line and the pixel electrode is set to be longer than the distance between the pixel electrode and the second signal line so that the sum of the first parasitic capacitance and the second parasitic capacitance is substantially the same as the third parasitic capacitance.

FIG. 1 is a figure schematically showing structure and an equivalent circuit of a liquid crystal display panel LPN which forms the liquid crystal display device using the column inversion drive system.

The liquid crystal display is equipped with a transmissive active-matrix type liquid crystal display panel LPN. The liquid crystal display panel LPN is equipped with an array substrate AR which is the first substrate, and a counter substrate CT which is a second substrate facing the array substrate AR and a liquid crystal layer LQ held therebetween. The liquid crystal display panel LPN is equipped with an active area ACT which displays images. The active area ACT includes a plurality of pixels PX arranged in the shape of a (m×n) matrix (here, m and n are positive integers).

In the active area ACT, "n" gate lines G (G1-Gn), and "n" capacitance lines C (C1-Cn) extending in a first direction X, and "m" signal lines S (S1-Sm) extending along a second direction Y that intersects perpendicularly the first direction X, respectively. The switching element SW electrically connected with the gate line G and the signal line S is formed in each pixel PX, and a pixel electrode PE is electrically connected with each switching element SW. In addition, TFT (thin film transistor) formed of poly-silicon is used for the switching element SW.

A common electrode CE, etc., which faces the pixel electrode PE is formed in the counter substrate CT. In addition, the common electrode CE is formed in common to a plurality of pixels PX.

Each gate line G is pulled out to the outside of the active area ACT, and connected to a gate driver GD. Each signal line S is pulled out to the outside of the active area ACT, and connected to a source driver SD. Each capacitance line C is pulled out to the outside of the active area ACT, and electrically connected with a voltage impressing portion VCS to which auxiliary capacitance voltage is supplied. The common electrode CE is electrically connected with an electric power supply portion VS to which common voltage is supplied. At least a portion of the gate driver GD and the source driver SD is formed in the array substrate AR, for example, and connected with a driving IC chip 2. In the illustrated example, the driving IC chip 2 as a signal source required for driving the liquid crystal display panel LPN is mounted on the outside of the active area ACT in the array substrate AR in the liquid crystal display panel LPN.

In the column inversion driving system, image signals whose polarity is different every signal line S are outputted alternately to each signal line S from the source driver SD. For example, in one frame period, positive image signals are supplied to odd-numbered signal lines S, and negative image signals are supplied to the even-numbered signal lines S. In a successive frame, the negative image signals are supplied to the odd-numbered signal lines S, and the positive image signals are supplied to the even-numbered signal lines S. Successively, the above frames are displayed alternately.

Figure 2:
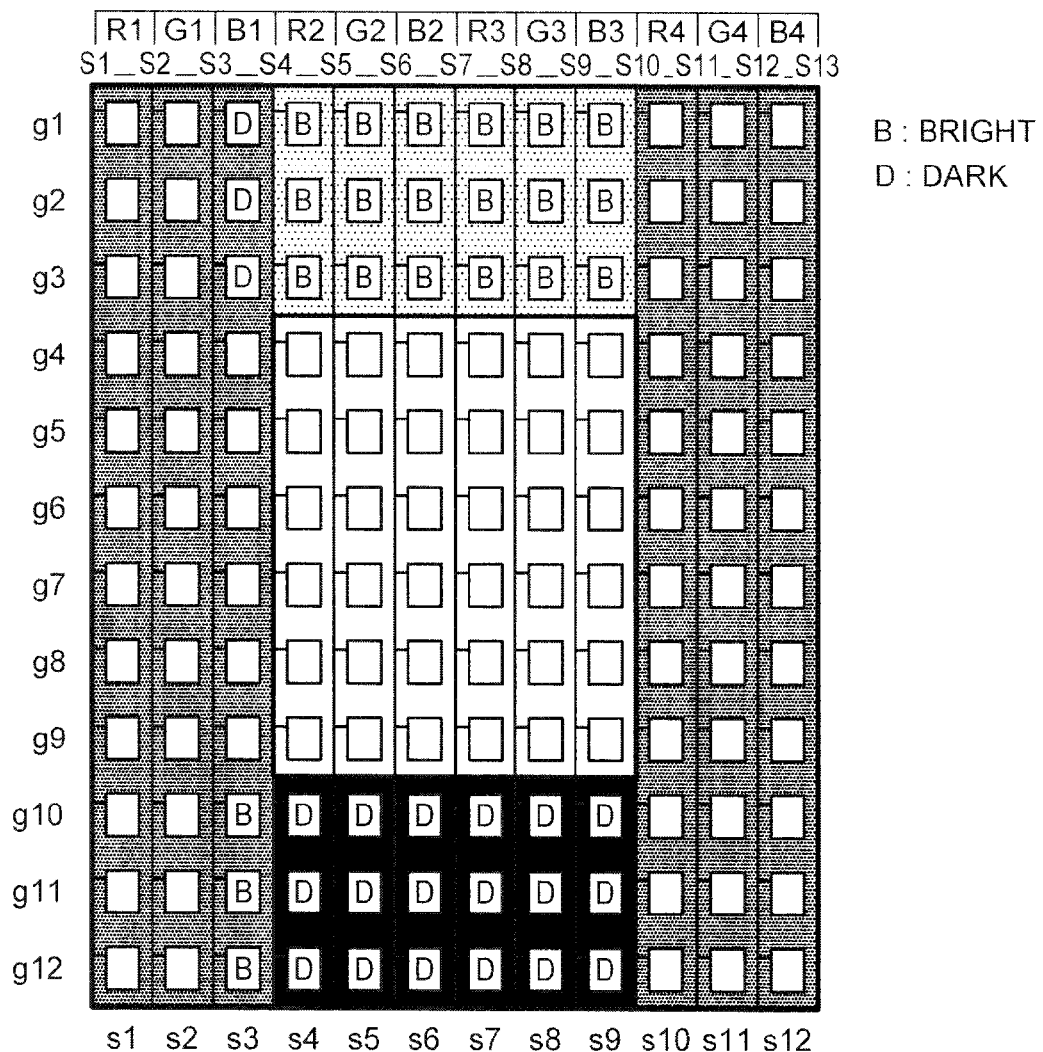
FIG. 2 is a figure showing vertical cross talk generated in the column inversion driving system.

FIG. 2 is a figure showing vertical cross talk generated in the column inversion driving system. FIG. 2 shows gradation (luminosity) of each pixel in the display panel LPN when the vertical cross talk is generated. Positions g1-g12 in the vertical direction in FIG. 2 correspond to the gate lines G1-G12, and positions in the lateral direction s1-s12 correspond to the signal lines S1-S12. In this display panel LPN, since the display panel LPN displays color images, a red (R) signal is supplied to lateral positions s1, s4 and s7 . . . , a green (G) signal is supplied to lateral positions s2, s5, s8 . . . , and a blue (B) signal is supplied to lateral position s3, s6, and s9 . . . .

In FIG. 2, the image of gray gradation is displayed as the background image, and the image of the high gradation (white) is displayed in the window. At this time, the display luminosity changes in a vertical stripe region (corresponding to lateral direction positions s4-s9) sandwiching the window. That is, an upper side region of the window is displayed brighter than the back ground image of the gray gradation, and an under side region of the window is displayed darker than the back ground image of gray gradation. This is sighted as a vertical stroke.

Figure 3:
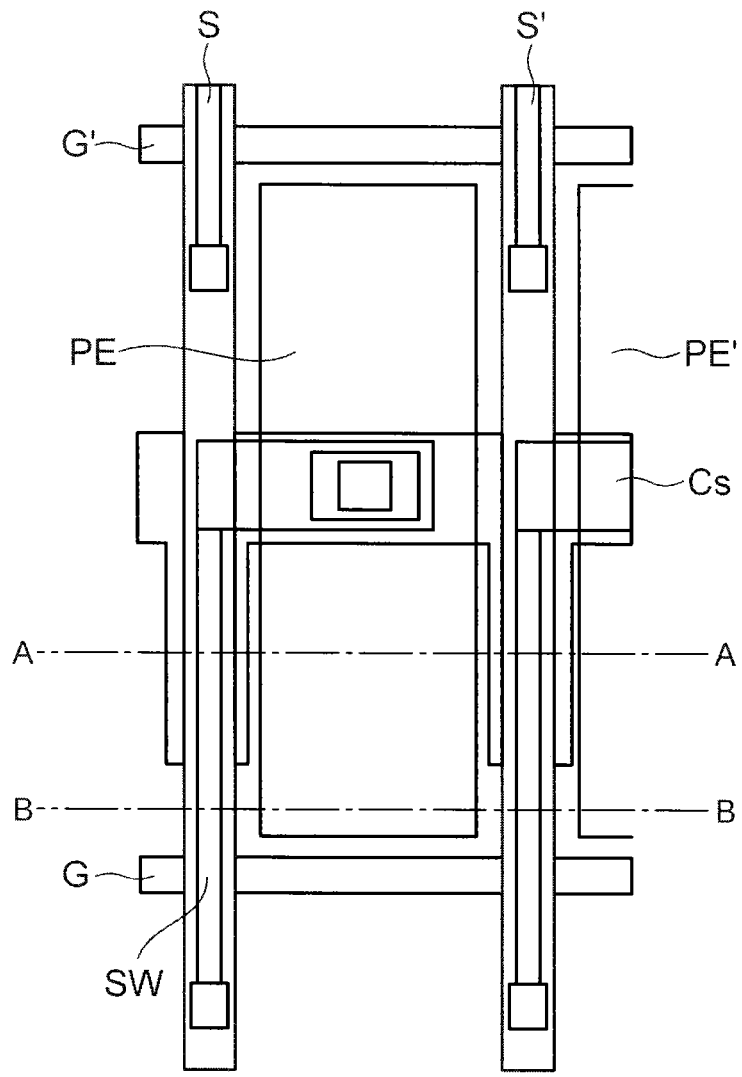
FIG. 3 is a plan figure showing structure of one pixel shown in the display panel.

FIG. 3 is a plan figure showing structure of one pixel shown in the display panel. On the left signal line side of the pixel electrode PE, a signal line S (left signal line) which supplies the pixel signal to the pixel electrode PE through a TFT (switching element SW) is arranged extending in a vertical direction (column direction). On the right side of the pixel electrode PE, a signal line S' (right signal line) which supplies the pixel signal to the adjacent pixel electrode PE' is arranged extending in the vertical direction. The pixel electrode PE is connected with a drain electrode of the TFT, the signal line S is connected with a source electrode of the TFT, and the gate electrode is connected with a lower gate line G extending in a lateral direction (row direction). An upper gate line G' is arranged in parallel with the lower gate line G for scanning adjacent pixel electrode. Further, a capacitance line Cs is arranged in parallel with the lower gate line G and the upper gate line G'.

Figure 4A:
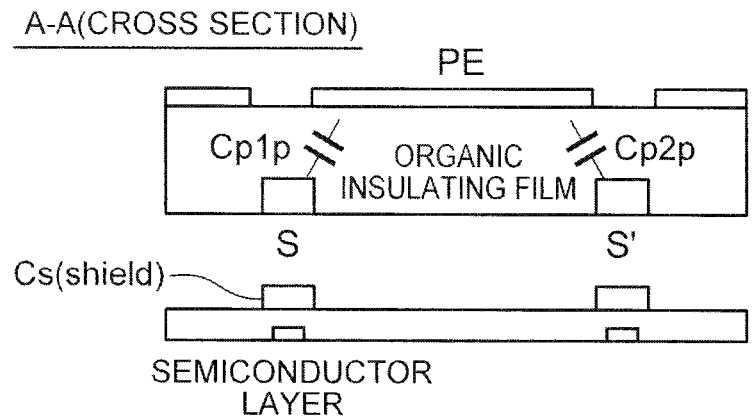
FIGS. 4A and 4B are figures showing cause of generation of the vertical cross talk.
Figure 4B:
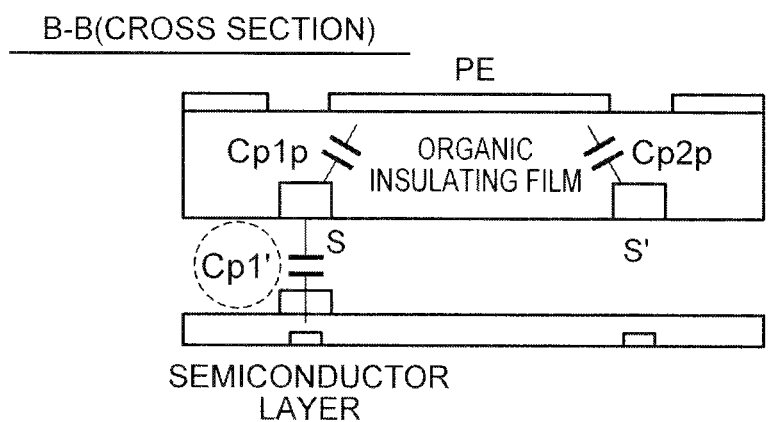

FIGS. 4A and 4B are figures showing cause of generation of the vertical cross talk. FIG. 4A is a cross-sectional figure of the pixel taken along line A-A shown in FIG. 3. FIG. 4B is a cross-sectional figure taken along line B-B of the pixel shown in FIG. 3.

As shown in FIG. 4A, the left signal line S and the right signal line S' are covered with an organic insulating film, and insulated from the pixel electrode PE. However, parasitic capacitances $Cp1p$ and $Cp2p$ are generated, respectively, between the pixel electrode PE and the left signal line S, and between the pixel electrode PE and the right signal line S'. While the pixel electrode PE and the left line S are electrically connected through the switching element SW at the time of the writing of a pixel signal, they are electrically insulated state each other holding the potential in other remaining period than the writing timing in the frame period. Therefore, when potential variation of the left signal line S and the right signal line S' occurs, display luminosity changes because the potential of the pixel electrode PE is affected through both parasitic capacitances on the left-and-right sides. This results in the generation of the vertical cross talk.

The cause of the generation of the cross-talk is explained in detail. In the example of the pixel structure shown in FIG. 4A, semiconductor layers which form the switching elements SW are arranged under the left signal line S and the right signal line S', respectively. The semiconductor layers correspond to the drain electrodes and are electrically connected with the pixel electrode PE. Shield lines Cs are arranged between the left and right signal lines S and S' and the semiconductor layers, respectively. The shield lines Cs are formed by arranging the capacitance line Cs, which are arranged in parallel with the gate lines, under the signal lines S1 and S2 so as to have shield function. In the case of providing the shield line Cs, the parasitic capacitance formed between the left signal line S and the semiconductor layer, and between the right signal line S' and the semiconductor layer is negligibly small On the other hand, the shield line Cs is not provided in FIG. 4 B. That is, the shield line Cs can not be formed because the shield line Cs and the gate line G are formed in the same layer, and the gate line G is arranged near the switching element SW along a cross-sectional line B-B. As a result, parasitic capacitance Cp1' is generated between the semiconductor layer electrically connected with the pixel electrode PE and the left signal line S as shown in FIG. 4B. Here, since the semiconductor layer is connected with the pixel electrode PE, the potential change of the signal line is transmitted to the pixel electrode PE through the parasitic capacitance Cp'. Accordingly, the potential change of the signal line affects to the pixel electrode potential through the parasitic capacitance Cp'.

On the other hand, although the parasitic capacitance generated on the right signal line S' side affects to the adjacent pixel electrode PE', the influence to the pixel electrode PE is negligibly small. Therefore, in FIG. 4B, the parasitic capacitance Cp1 on the left signal line side S becomes (Cp1$p$+Cp'), and the parasitic capacitance Cp2 on the right signal line S' side becomes (Cp2$p$). Even if the parasitic capacitance resulted from the above structure becomes Cp1$p$=Cp2$p$, a relation of Cp1>Cp2 is formed under the influence of the parasitic capacitance Cp'. In this example, although the relation Cp1>Cp2 is formed under the influence of the parasitic capacitance Cp1' between the semiconductor layer and the left signal line, the balance between Cp1 and Cp2 may be lost due to other parasitic capacitances.

Then, the cause why the vertical cross talk generates in the column inversion driving system is explained in detail.

[Column Inversion Driving System: White Window, Cp1=Cp2]

FIGS. 5A and 5B are figures showing the generation of the vertical cross talk when the parasitic capacitances Cp1 and Cp2 are equal in the column inversion driving system.

FIG. 5A is a figure schematically showing the polarity of the pixels in a certain frame period. In FIG. 5A, positive image signals are supplied to odd signal lines S1, S3, . . . , and the pixel electrodes of the pixels arranged in the odd numbered columns are charged to positive. On the other hand, negative image signals are supplied to even signal lines S2, S4, . . . , and the pixel electrodes of the pixels arranged in the even numbered columns are charged to negative. The background image is displayed in the gray gradation luminosity, and the image in the window is displayed in high gradation luminosity (white). In addition, the polarity is inverted at the following frame period. Following explanation is made referring to an example of a normally black mode in which the display becomes black in case no voltage is impressed to the liquid crystal layer.

FIG. 5B is a time chart showing potential change of the signal line S and the pixel electrode PE at the timing of the image signal writing. The horizontal axis of FIG. 5B expresses time progress with the vertical direction positions g1, g2 . . . , which the gate line selects, and the vertical axis expresses potential. The solid line in the figure expresses the image signals supplied to the signal lines S3, S4, . . . , and the dotted line expresses the potential of the corresponding pixel. Moreover, (R), (G) and (B) signals are supplied to the signal line S corresponding to red, green, and blue colors shown in the figure.

Since the gray gradation is displayed in the pixels arranged in the vertical direction positions g1-g3, the value (absolute value) of the signal potential outputted to the signal lines S3-S10 is the same. When displaying the pixels in the vertical direction position g4, high-luminosity negative potential is impressed to the signal line S4. Since the signal line S3 continuously supplies the gray gradation potential at this time, there is no change of potential. On the other hand, since the signal line S4 changes from the negative gray gradation potential to negative white color potential, the potential change is generated in a negative direction. For this reason, in the pixel electrodes PE connected with the signal line S3 in the vertical direction positions g1-g3, since the parasitic capacitance Cp1 equals to the parasitic capacitance Cp2, the positive potential of the pixel electrodes PE holding the positive potential falls under the influence of change of the right signal line. As a result, the liquid crystal impressing voltage applied to the pixels PX in the positions is lowered, and the luminosity falls.

High-luminosity positive potential is impressed to the signal line S5 when displaying the pixels in the vertical direction position g4. The negative potential applied to the signal line S4 and the positive potential supplied to the adjacent signal line S5 have the same absolute value, respectively. That is, the potential change directions of the signal line S4 and the adjacent signal line S5 are opposite each other, and the respective amplitudes are equal. Here, the parasitic capacitance Cp1 equals to the parasitic capacitance Cp2. For this reason, potential changes of the same intensity and opposite directions act on the pixel electrodes PE of the pixels in the vertical direction positions g1-g3 connected with the signal line S4, and the potential changes are canceled each other. Therefore, the potential which the pixel electrode PE holds does not change.

Regarding the signal lines S6-S8 when displaying the vertical direction position g4, the potential changes are offset each other because the potential changes of the same intensity in opposite directions act on the pixel electrodes PE connected with the signal lines in a same manner as the time of displaying the pixel electrodes PE connected with the signal line S4. Therefore, the potential which the pixel electrode PE holds does not change.

High-luminosity positive potential is impressed to the signal line S9 when displaying the vertical direction position g4. On the other hand, negative potential of gray gradation is continuously supplied to the signal line S10. At this time, while the signal line S9 changes to a positive direction because the signal line S9 changes from positive gray gradation potential to positive white potential, the potential of the signal line S10 does not change keeping the negative gray gradation. For this reason, in the pixel electrodes PE of positive potential connected with the signal line S9 in the vertical direction positions g1-g3, since the parasitic capacitance Cp1 equals to Cp2, the potential of the pixel electrodes PE rises under the influence of the potential change of the signal line S9. As a result, the liquid crystal impressing voltage of the pixels PX in the positions also rises, and the luminosity increases.

Therefore, in the vertical direction positions g1-g3, the pixel connected to the signal line S3 changes darkly, and in the pixels connected with the signal lines S4-S8, there is no change of luminosity, and the pixels connected with the signal line S9 changes brightly.

Potential change ΔVpix which the above pixel electrode PE receives can be expressed with a formula (1).

$$\Delta V\text{pix} = (Cp1/C\text{total} \times \Delta V\text{sigleft}) - (Cp2/C\text{total} \times \Delta V\text{sigright})$$  Formula (1)

Here, Cp1: the parasitic capacitance between the left signal line S and the pixel electrode PE, Cp2: the parasitic capacitance between the right signal line S' and the pixel electrode PE, Ctotal: the total capacitance (liquid crystal capacitance, auxiliary capacitance and parasitic capacitance, are included), ΔVsigleft: potential change amount (absolute value) of the left signal line S, and ΔVsigright: potential change amount (absolute value) of the right signal line S', In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 5A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes PE connected with the lines g1-g3. Therefore, if the above-mentioned operation is applied, in the vertical direction positions g10-g12, the pixels connected with the line S3 changes brightly. In the pixels connected with the signal lines S4-S8, there is no change of luminosity, and the pixels connected with the signal line S9 change darkly.

Figure 6:
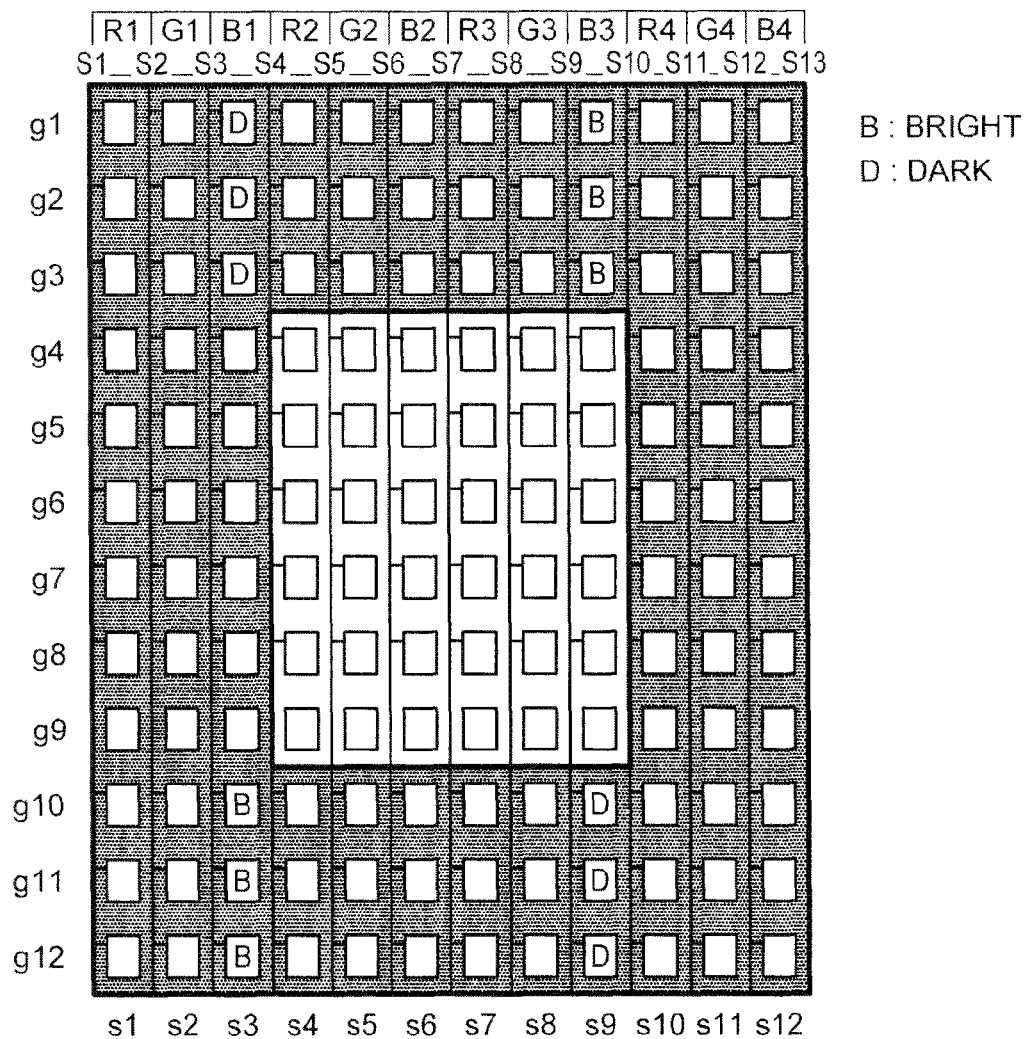
FIG. 6 is a figure showing a display state when the values of parasitic capacitances $Cp1$ and $Cp2$ are equal in the column inversion driving system.

FIG. 6 is a figure showing a display state when the values of parasitic capacitances Cp1 and Cp2 are equal in the column inversion driving system.

As shown in FIG. 6, bright and dark pixels occur only in the line portions extending along ends of the window in the column dorection. That is, the display luminosity of the gray gradation of all the pixels (lateral direction positions s4-s9) surrounding the window does not change change. The reason is follows: the influence of potential change is canceled under the conditions of Cp1=Cp2 because the potential changes of the signal line S and the adjacent signal line S are the same and act in the opposite directions at the starting time of the window display.

[Column Inversion Driving System: White Window, Cp1>Cp2]

FIG. 7 is a figure showing the generation of the vertical cross talk when the parasitic capacitance Cp1 is larger than the parasitic capacitance Cp2 in the column inversion driving system.

Figures 7A, 7B:
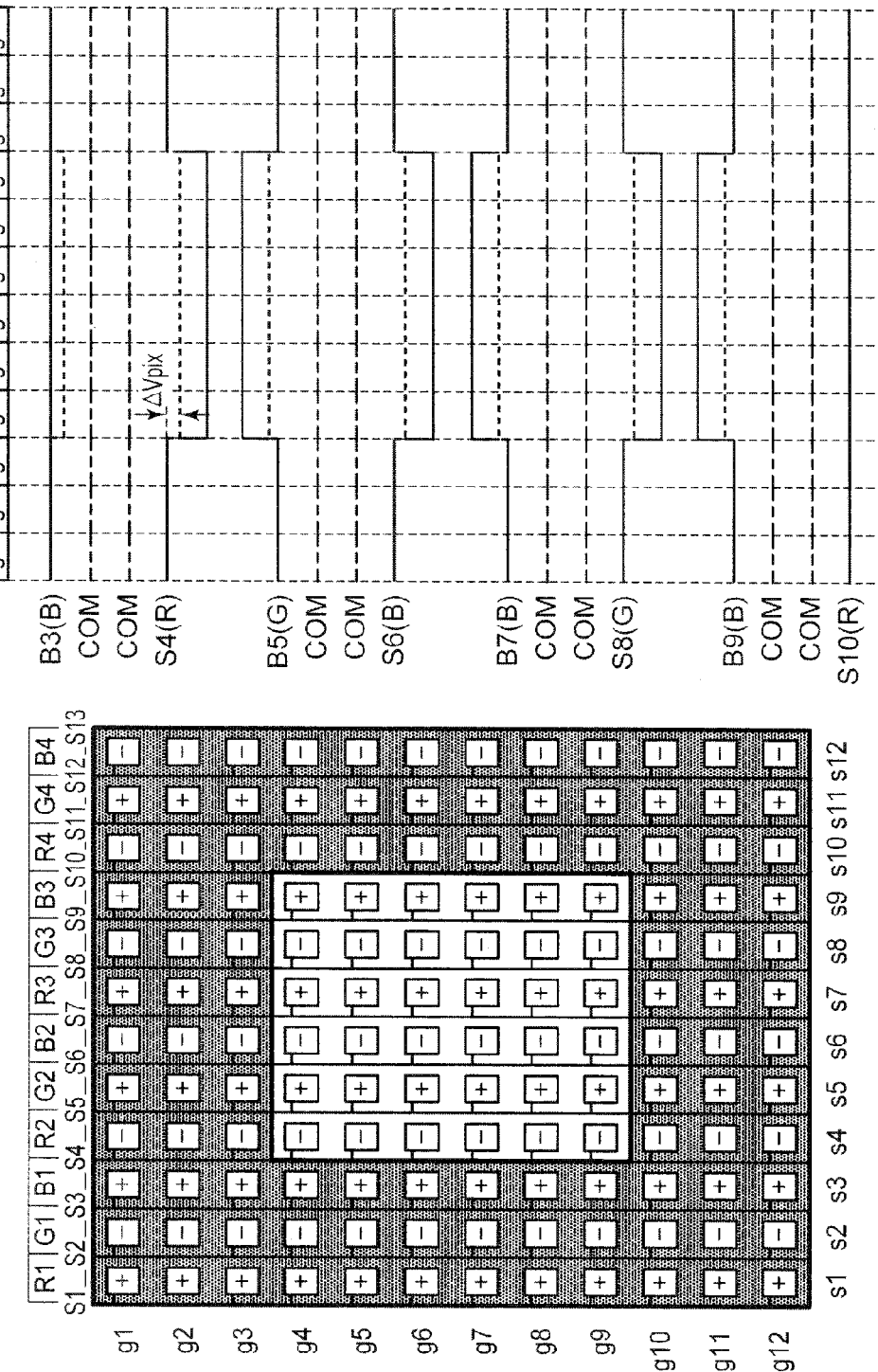
FIGS. 7A and 7B are figures showing generation of the vertical cross talk when the parasitic capacitance $Cp1$ is larger than the parasitic capacitance $Cp2$ in the column inversion driving system.

FIG. 7A is a figure schematically showing the polarity of the pixel in one frame. Since FIG. 7A is the same as FIG. 5A, detailed explanation is omitted. FIG. 7B is a time chart showing the potential change of the signal line S and the pixel electrode PE at the time of the image signal writing.

Since the gray gradation is displayed in the pixels arranged in the vertical direction positions g1-g3, the value (absolute value) of the signal potential outputted to the signal lines S3-S10 is the same. When displaying the pixels in the vertical direction position g4, high-luminosity negative potential is impressed to the signal line S4. Since the signal line S3 continuous supply the gray gradation potential at this time, there is no change of potential. On the other hand, since the signal line S4 changes from negative gray gradation potential to negative white color potential, the potential change is generated in a negative direction. For this reason, in the pixel electrodes PE connected with the signal line S3 in the vertical direction positions g1-g3, the positive potential of the pixel electrode PE falls under the influence of potential change of the adjacent signal line S4. As a result, the liquid crystal impressing voltage applied to the pixels PX in the positions is lowered, and the luminosity falls.

High-luminosity positive potential is impressed to the signal line S5 when displaying the pixels in the vertical direction position g4. The negative potential applied to the signal line S4 and the positive potential applied to the adjacent signal line S5 have the same absolute values, respectively. That is, the potential change directions of the signal line S4 and the adjacent signal line S5 are opposite, and the respective change amount is equal. Here, the parasitic capacitance Cp1 is larger than the parasitic capacitance Cp2. For this reason, the potential of the pixel electrodes PE connected with the signal lines S4 in the vertical directions g1-g3 is more affected by the potential change by the signal lines S4 than the potential change of the adjacent signal line. Accordingly, the potential of the pixel electrodes PE holding negative potential changes to a negative direction, i.e., the potential change direction of the signal line S4. As a consequence, the liquid crystal impressing voltage increases, and the luminosity of the pixels PX in this position increases.

Regarding the signal lines S6-S8 when displaying the vertical direction position g4, potential with the same magnitude in the opposite direction act on the connected pixel electrodes PE as well as when displaying the pixels connected with the signal line S4. However, the parasitic capacitance Cp1 is larger than the parasitic capacitance Cp2, the potential which the pixel electrodes PE hold becomes larger. As a consequence, the luminosity of the pixels PX in this position increases.

High-luminosity positive potential is impressed to the signal line S9 when displaying the vertical direction position g4. On the other hand, negative potential of gray gradation is continuously impressed to the signal line S10. At this time, while the signal line S9 changes in the positive direction from positive gray gradation potential to positive white potential, the potential of the signal line S10 does not change keeping the negative gray gradation potential. For this reason, in the pixel electrodes PE of positive potential connected with the signal line S9 in the vertical direction positions g1-g3, the potential of the pixel electrodes PE rises under the influence of the potential change of the signal line S9. As a result, the liquid crystal impressing voltage of the pixels PX in the positions becomes high, and the luminosity increases Therefore, in the vertical direction positions g1-g3, the pixels connected with the signal line S3 change darkly, and in the pixels connected with the signal lines S4-S9, the pixels change brightly.

Potential change ΔVpix which the pixel electrode PE explained above receives can be similarly expressed with a following formula (1).

$$\Delta V\text{pix} = (Cp1/C\text{total} \times \Delta V\text{sigleft}) - (Cp2/C\text{total} \times \Delta V\text{sigright})$$ Formula (1)

In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 7A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes connected with the lines g1-g3. Therefore, if the above-mentioned operation is applied, in the vertical direction positions g10-g13, the pixels connected with the signal lines S3 change brightly. On the other hand, the pixels connected with the signal lines S4-S9 change darkly.

Figure 8:
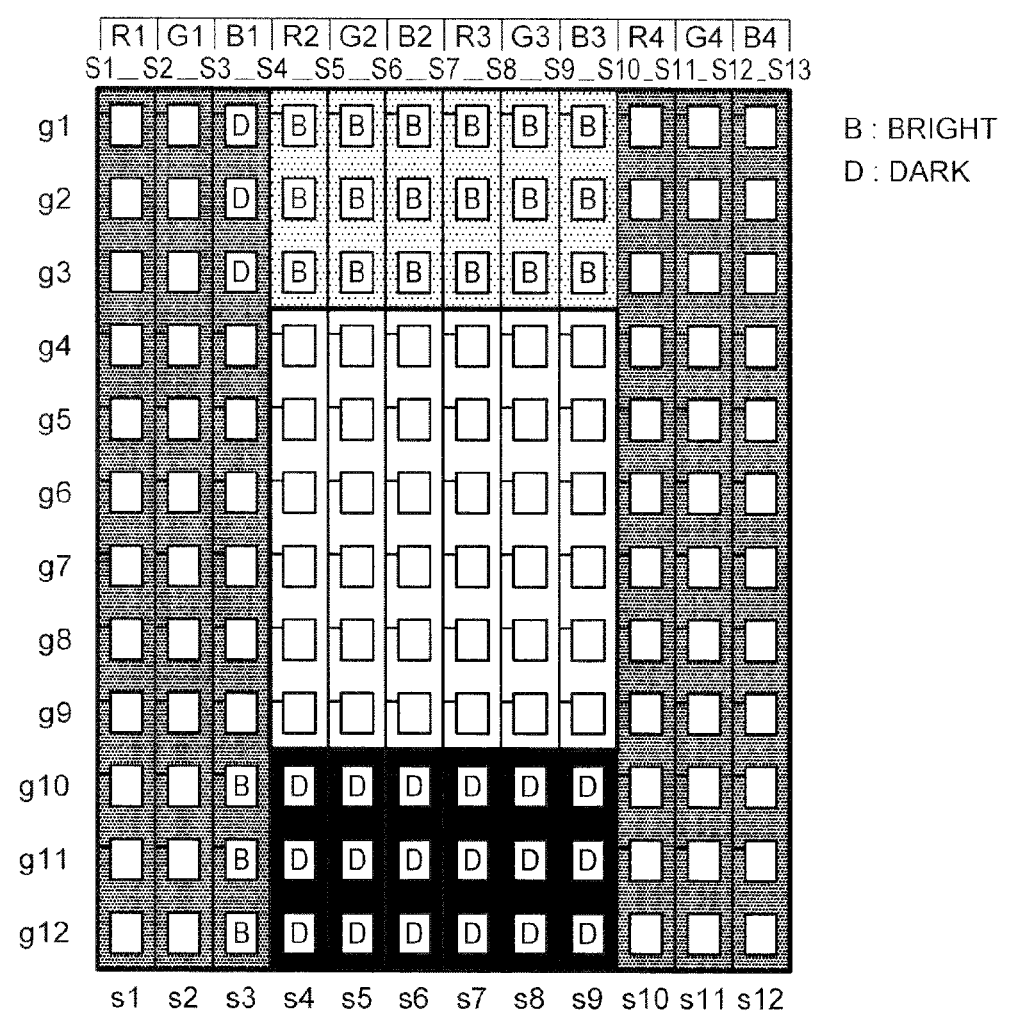

FIG. 8 is a figure showing the display state when the parasitic capacitance Cp1 is larger than the parasitic capacitance Cp2 in the column inversion driving system.

As shown in FIG. 8, the display luminosity of the gray gradation of all the pixels arranged sandwiching the window (lateral direction positions s4-s9) changes. Therefore, when parasitic capacitance Cp1 differs from Cp2 mutually (usually Cp1>Cp2), it turns out that the vertical cross talk occurs.

[Column Inversion Driving: Color Window]

FIG. 9 is a figure showing the generation of the vertical cross talk in a color window in the column inversion driving system. That is, although it is a case where a green window picture is displayed on the background image of gray gradation in FIG. 9, parasitic capacitances Cp1 and Cp2 are not conditions for comparison.

Figures 9A, 9B:
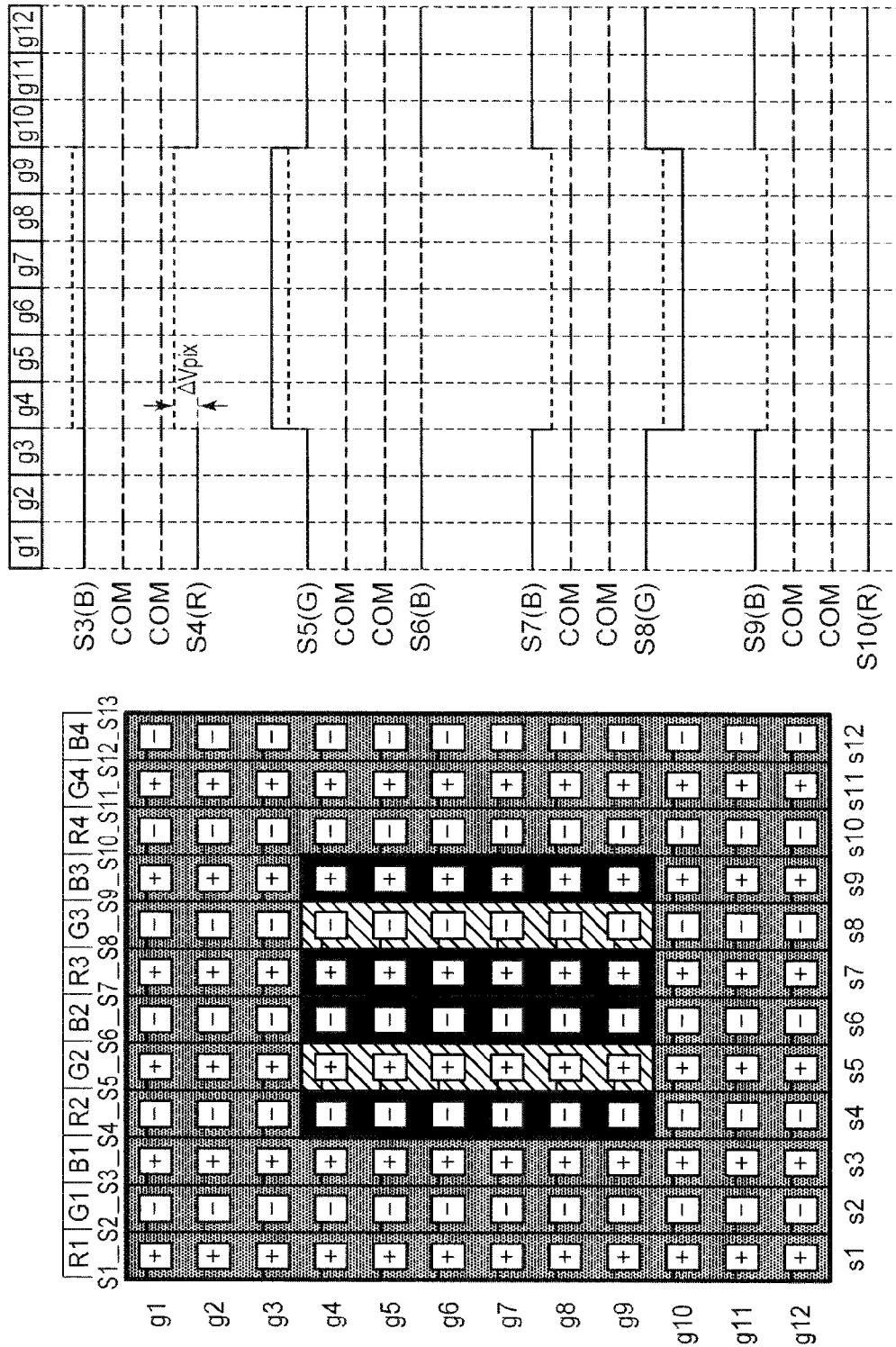
FIGS. 9A and 9B are figures showing the generation of the vertical cross talk in case of displaying a color window in the column inversion driving system.

FIG. 9A is a figure schematically showing the polarity of the pixels in one frame. In FIG. 9A, positive image signals are supplied to odd signal lines S1, S3 . . . , and the pixel electrodes of the pixels arranged in the odd numbered columns are charged to positive. On the other hand, negative image signals are supplied to the even signal lines S2, S4 . . . , and the pixel electrodes of the pixels arranged in the even numbered columns are charged to negative. The background image is displayed in the gray gradation luminosity, and the image in the window is displayed in a green color. Accordingly, predetermined gradation signals are outputted to the signal lines S5, S8 for supplying green color signal. The signals of "0" V corresponding to black picture are supplied to the signal lines S4, S6, S7 and S9 for supplying red and blue signals. In addition, the polarities are inverted in the next frame.

FIG. 9B is a time chart showing potential change of the signal line S and the pixel electrode PE at the time of image signal writing.

Since the gray gradation is displayed in the pixels arranged in the vertical direction positions g1-g3, the value (absolute value) of the signal potential outputted to the signal lines S3-S10 is the same. When displaying the pixels in the vertical direction position g4, "0"V voltage is impressed to the signal line S4. The signal line S3 continuously supplies gray gradation potential at this time, and there is no change of potential. On the other hand, since the signal line S4 changes from negative gray gradation potential to black potential (0V), the potential change is generated in a positive direction. For this reason, in the pixel electrodes PE connected with the signal line S3 in the vertical direction positions g1-g3, the positive potential of the pixel electrode PE rises under the influence of the potential change of the adjacent signal line S4. As a result, the liquid crystal impressing voltage applied to the pixels PX in the positions rises, and the luminosity increases.

The potential of "0" V is supplied to the signal line S4 when displaying the vertical direction position g4, and potential change in the positive direction occurs as described above. On the other hand, since the positive green high gradation potential is impressed to the adjacent signal line S5, the signal line S5 changes from positive half tone gradation potential to the positive high gradation potential, i.e., the change in the positive direction generates. For this reason, the pixel electrodes PE connected with the signal line S4 in the vertical direction positions g1-g3 and holding the negative potential are affected by the potential change in the same direction (positive direction) from the signal lines S4 and S5, and the absolute value of the negative potential falls. That is, the luminosity of the pixels PX in the positions falls.

High positive gradation potential of green color is supplied to the signal line S5 when displaying the vertical direction position g4, and potential change in the positive direction occurs as described above. On the other hand, potential "0"V is supplied to the adjacent signal line S6, and the change in the positive direction is generated. For this reason, the pixel electrodes PE connected with the signal line S5 in the vertical direction positions g1-g3 and holding the positive potential are affected by the potential change in the same direction (positive direction) from the signal lines S5 and S6, and the absolute value of the positive potential increases. That is, the luminosity of the pixels PX in the positions increases.

"0"V potential is supplied to the signal line S6 when displaying the vertical direction position g4, and potential change in the positive direction occurs as described above. On the other hand, potential "0"V is also supplied to the signal line S7, and the potential of the signal line S7 changes in the negative direction. Since the potential change direction of the signal lines S6 and S7 is opposite, and the potential change amount of the signal lines S6 and S7 is the same each other, the potential of the pixel electrodes PE connected with the signal line S6 in the vertical direction positions g1-g3 does not change without being affected by the signal line and the adjacent signal line under the condition of Cp1=Cp2. That is, the luminosity of the pixels PX in the positions does not change.

Similarly, it turns out that the luminosity of the pixels connected with the signal line S7 in the vertical direction positions g1-g3 falls, the luminosity of the pixels connected with the signal line S8 increases, and that the luminosity of the pixels connected with the signal line S9 falls.

Therefore, in the vertical direction positions g1-g3, the luminosity of the pixels connected with the signal lines S3, S5 and S8 changes brightly. In the pixels connected with the signal line S6, there is no change of luminosity. In the pixels connected with the signal line S4, S7 and S9, the luminosity change darkly.

In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 9A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes connected with the lines g1-g3.

Therefore, if the above-mentioned operation is applied, in the vertical direction positions g10-g13, the pixels connected with the signal line S3, S5 and S8 change darkly. In the pixel connected with the signal S6, there is no change of luminosity, and the pixels connected with the signal lines S4, S7 and S9 change brightly.

Figure 10:
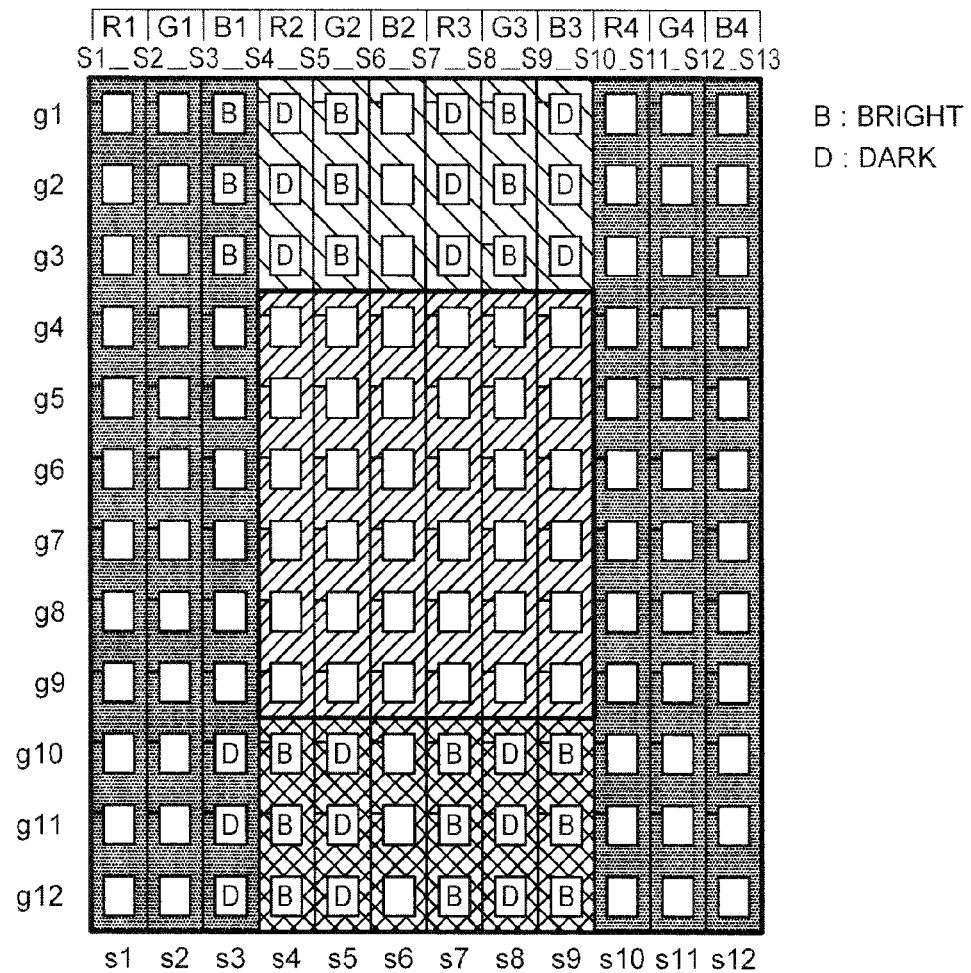
FIG. 10 is a figure showing the display state in a case of displaying a green window in the column inversion driving system.

FIG. 10 is a figure showing the display state in the case of displaying a green window in the column inversion driving system.

As shown in FIG. 10, the display luminosity in the region sandwiching the window (lateral direction positions s4-s9) changes. On the upper side of the window (vertical direction positions g1-g3), the luminosity of the pixels connected with the signal lines S5 and S8 for displaying the green color increases, and the luminosity of the pixels connected with the signal lines S4, S6, S7 and S9 for displaying the red and blue colors decreases or does not change. As a result, in this gray gradation region, green color is emphasized and colored in light green. On the down side of the window (vertical direction positions g10-g12), the luminosity of the pixels connected with the signal lines S5, S8 for displaying the green color decreases, and the luminosity of the pixels connected with the signal lines S4, S6, S7 and S9 for displaying red and blue colors increases or does not change. As a result, in this gray gradation region, green color is displayed by being weaken and colored in a complementary color.

Potential change ΔVpix which the above pixel electrode PE receives can be expressed with a following formula (2).

$$\Delta Vpix = (Cp1/Ctotal \times \Delta Vsigleft) + (Cp2/Ctotal \times \Delta Vsigright) \quad \text{Formula (2)}$$

Although the second term is subtracted from the first term in the right side in the formula (1), the first term and the second term in the right side are added in the formula (2). Therefore, when displaying the color window, it turns out that the vertical cross talk occurs by adding the parasitic capacitances Cp1 and Cp2 without depending on the difference between parasitic capacitances Cp1 and Cp2.

Following three measures are thought for reducing the vertical cross talk in the column inversion driving system by the above analysis.

(1) to make small the difference between the parasitic capacitance (CP1) between one signal line and the pixel electrode PE and the parasitic capacitance (CP2) between the pixel electrode PE and the adjacent signal line.

(2) to make small the parasitic capacitance values (CP1) and (CP2).

(3) to make large the total capacitance value of the pixel.

However, the size of the pixel tends to become large, and the influence by the parasitic capacitances (CP1) and (CP2) also tend to become large. The tendency works disadvantageously for reducing the vertical cross talk.

Next, referring to the generation of the vertical cross talk in the above-mentioned column inversion driving system, the vertical cross talk in the pseudo-dot inversion driving system is explained.

The dot inversion driving system is a driving method to carry out a dot inversion display so that pixels to which positive/negative polarity image signals are applied are arranged by turns in the shape of a check. In this dot inversion driving system, while the display grace is improved, for example, the generation of a flicker is controlled, power consumption increases.

Figures 11, 12:
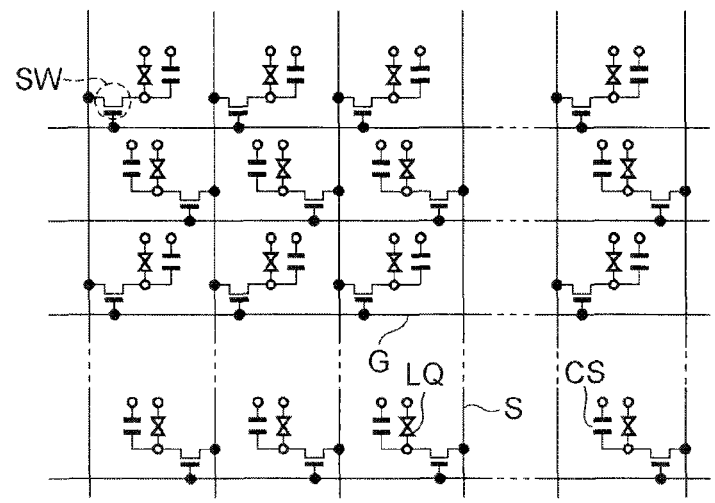
FIG. 11 is a figure showing connection between a pixel and a signal line in the pseudo-dot inversion driving system and the polarity of the pixel according to the embodiment.
FIG. 12 is a figure showing an equivalent circuit of the pixels in the pseudo-dot inversion driving system according to the embodiment.

FIG. 11 is a figure showing connection between the pixel and the signal line, and the polarity of the pixels in the pseudo-dot inversion driving system according to this embodiment.

In the liquid crystal display panel LPN shown in FIG. 11, the signal lines S1, S3, . . . of odd numbered columns supply positive signals to the pixels PX, and the signal lines S2, S4, . . . of even numbered columns supply negative signals. The signal lines S1, S3, . . . of odd numbered columns and the signal lines S2, S4, . . . of even numbered columns are connected with left and right hand pixels PX in a staggered shape in the vertical direction in the vertical positions g1-g12, respectively.

FIG. 12 is a figure showing the equivalent circuit of the pixels in the pseudo-dot inversion driving system according to this embodiment. The switching elements SW in the pixels are connected with different signal lines S every row line in this equivalent circuit, respectively.

[Pseudo-dot Inversion Driving System: White Window, Cp1=Cp2]

FIG. 13 is a figure showing the generation of the vertical cross talk when parasitic capacitances Cp1 and Cp2 are equal in the pseudo-dot inversion driving system according to this embodiment. That is, FIG. 13 shows a display state in the case of Cp1=Cp2 in which a white window picture is displayed on the background image of gray gradation.

Figures 13A, 13B:
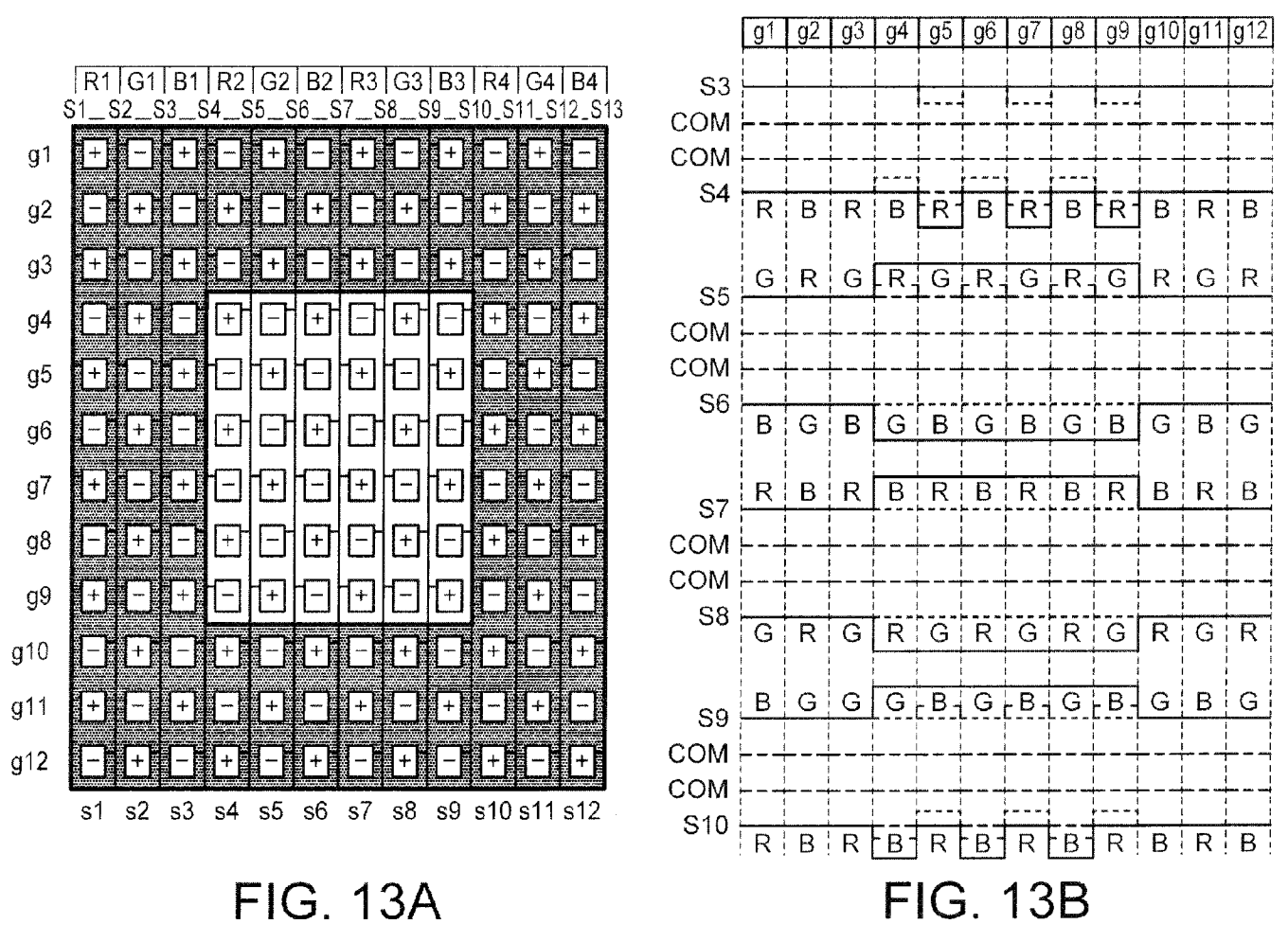

FIG. 13A is a figure schematically showing the polarity of the pixels in one frame. In FIG. 13A, the signal lines S1, S3, . . . of odd numbered columns supply positive signals to the pixels PX, and the signal lines S2, S4, . . . of even numbered column supply negative signals. The signal lines S1, S3, . . . of odd numbered columns and the signal lines S2, S4, . . . of even numbered columns are connected with left and right hand pixels PX in a staggered shape in the vertical direction, respectively. That is, FIG. 13 shows a display state in which a white window picture with high gradation luminosity is displayed on the background image with gray gradation luminosity. At the next frame, the polarity is inverted.

FIG. 13B is a time chart which shows potential change of the signal line S and the pixel electrode PE in the case of image signal writing. The lateral axis of FIG. 13B expresses time progress by the vertical direction positions g1, g2 . . . , which the gate line selects, and the vertical axis expresses potential. The solid line in the figure expresses the picture signals supplied to the signal lines S3, S4 . . . , and the dotted line expresses the potential of the corresponding pixel.

In the vertical direction positions g1-g3, since the gray gradation pictures are displayed, the value (absolute value) of the signal potential outputted to the signal lines S3-S10 is the same. When displaying the vertical direction position g4, since the gray gradation potential is outputted to the signal line S4, there is no potential change, and high-luminosity positive potential is impressed to the signal line S5.

First, pixels PX in the vertical direction position g1 are explained. In the pixel electrodes PE (Blue) of the vertical direction position g1 connected with the signal line S3, the absolute value of the potential becomes small by the influence of the potential change when outputting the high-luminosity negative potential to the adjacent signal line S4 at the timing of displaying the vertical direction positions g5, g7 and g9. That is, the luminosity of the pixels PX becomes dark. In the pixel electrode PE (Red) of the vertical direction position g1 connected with the signal line S4, the absolute value of the potential becomes small at the timing when displaying the vertical direction positions g4-g9 due to the influence by the potential change of the signal line S4 every row line and the potential change of the adjacent signal line S5 in the g4 and g10. That is, in the selected periods g4, g6, and g8, the liquid crystal impressing voltage reduces. Accordingly, the luminosity of the pixels PX becomes dark. In the pixel electrodes PE (Green) of the vertical direction position g1 connected with the signal line S5, while the high-luminosity positive potential of the signal line S5 and the high-luminosity negative potential of the adjacent signal line S6 interact each other, the influence is offset since CP1 equals to CP2. That is, there is no change of luminosity in the pixels PX. It is possible to obtain the luminosity change of each pixel PX applying the same analysis to the signal lines S7, S8 . . . .

Next, the pixels PX in the vertical direction position g2 are explained. In the pixel electrodes PE (Blue) in the vertical direction position g2 connected with the signal line S4, the absolute value of the potential becomes large by the influence of the potential change at the time of outputting the high-luminosity negative potential to the signal line S4 when displaying the vertical direction positions g5, g7 and g9. That is, the luminosity of the pixels PX becomes bright. In the pixel electrodes PE (Red) of the vertical direction position g2 connected with the signal line S5, the absolute value of the potential becomes large at the timing when displaying the vertical direction positions g4-g9 due to the influence by the potential change of the signal line S4 every row line and the potential change of the signal line S5 in the g4 and g10. That is, in the selected periods g4, g6 and g8, the liquid crystal impressing voltage increases. The luminosity of the pixels PX becomes bright. In the pixel electrodes PE (Green) of the vertical direction position g2 connected with the signal line S6, while the high-luminosity negative potential of the signal line S6 and the high-luminosity positive potential of the adjacent signal line S5 interacts each other, the influence is offset since CP1 equals to CP2. That is, there is no change of luminosity in this pixel PX. It is possible to obtain the luminosity change of each pixel PX applying the same analysis to the signal lines S7, S8, . . . .

Regarding the pixels PX in the vertical direction position g3, the same analysis as the pixels PX in the vertical direction position g1 can be made.

In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 13A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes connected with the lines g1-g3.

Therefore, if above-mentioned analysis is applied, the luminosity of the vertical direction positions g10-g13 becomes in a opposite state to the luminosity of the vertical direction positions g1-g3.

Figure 14:
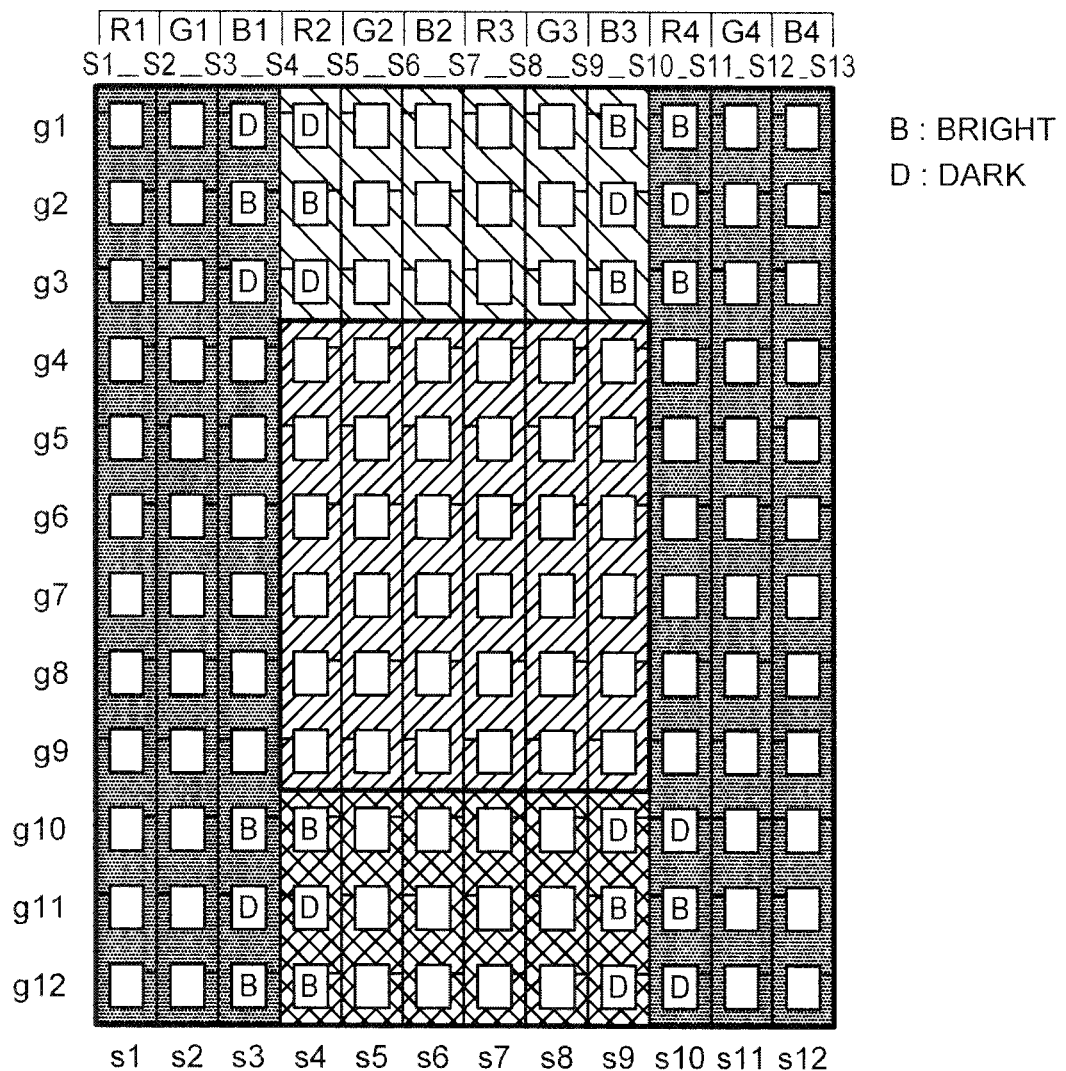
FIG. 14 is a figure showing the display state when parasitic capacitances $Cp1$ and $Cp2$ are equal in the pseudo-dot inversion driving system according to the embodiment.

FIG. 14 is a figure showing the display state according to the vertical cross talk when parasitic capacitances Cp1 and Cp2 are equal in the pseudo-dot inversion driving system according to this embodiment.

As shown in FIG. 14, bright and dark pixels occur in line portions extending along both ends of the window in the column direction. However, the display luminosity of gray gradation in all the pixels PX sandwiching the window (lateral direction positions s4-s9) does not change. That is, influence of potential change is canceled under the condition of Cp1=Cp2 because the potential changes of the signal line S and the adjacent signal line S are the same and interacts in the opposite direction.

Moreover, since the bright line and dark line are reversed in the odd row lines and even row lines as shown in FIG. 14, the light and dark lines are eased by being equalized in visual effect.

[Pseudo-dot Inversion Driving System: White Window, Cp1>Cp2]

Figures 15A, 15B:
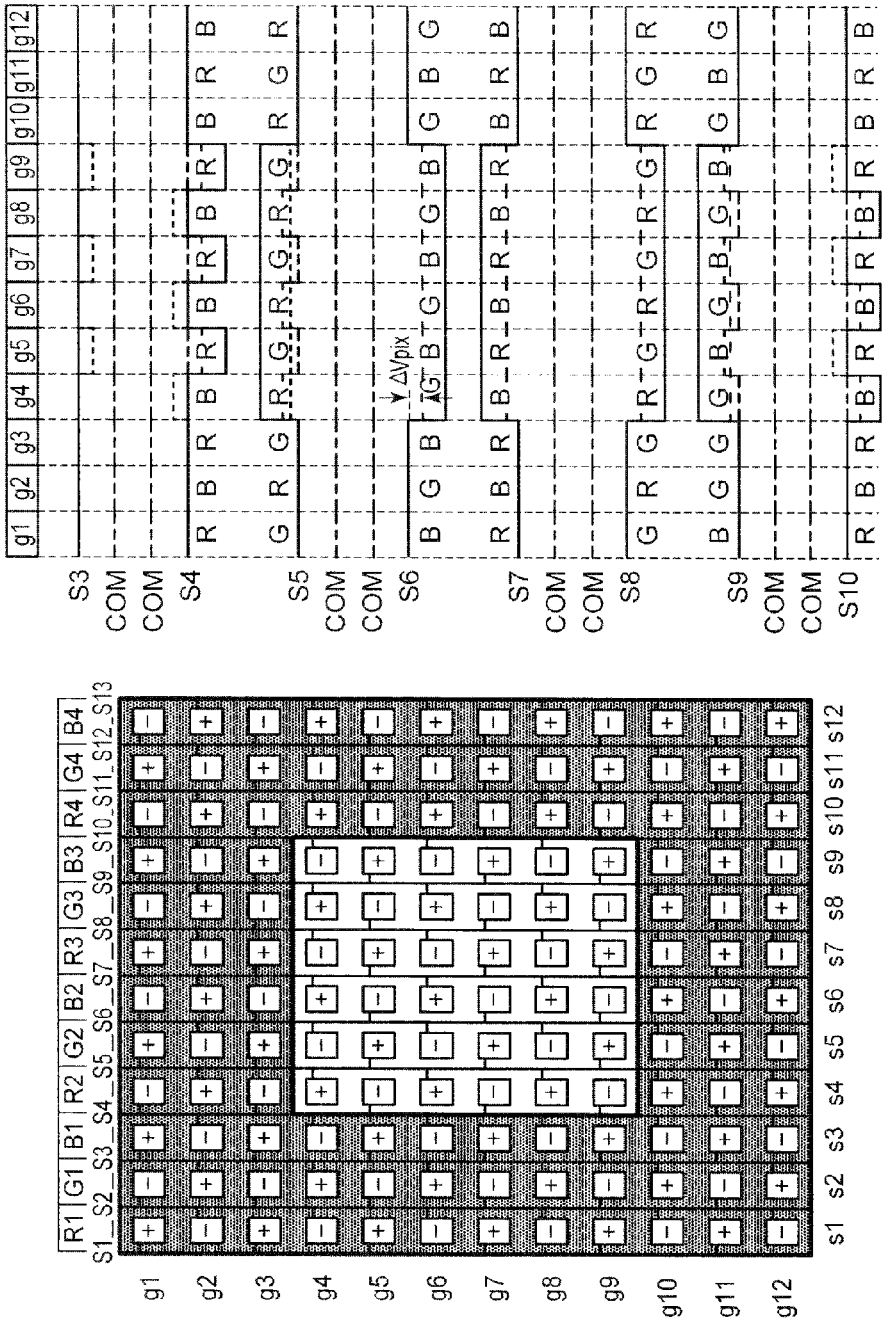
FIGS. 15A and 15B are figures showing the generation of the vertical cross talk when the parasitic capacitance $Cp1$ is larger than the parasitic capacitance $Cp2$ in the pseudo-dot inversion driving system according to the embodiment.

FIGS. 15A and 15B are figures showing the generation of the vertical cross talk when the parasitic capacitance Cp1 is larger than the parasitic capacitance Cp2 in the pseudo-dot inversion driving system according to this embodiment.

FIG. 15A is a figure schematically showing the polarity of the pixels in one frame. Since it is the same as that shown in FIG. 13A, detailed explanation is omitted. FIG. 15B is a time chart schematically showing potential change of the signal line S and the pixel electrode PE at the timing of image signal writing.

In the vertical direction positions g1-g3, since the gray gradation is displayed, the value (absolute value) of the signal potential outputted to the signal lines S3-S10 is the same. When displaying the vertical direction position g4, since the gray gradation potential is outputted to the signal line S4, there is no potential change, and high-luminosity positive potential is impressed to the signal line S5.

First, pixels PX in the vertical direction position g1 are explained. In the pixel electrodes PE (Blue) of the vertical direction position g1 connected with the signal line S3, the absolute value of the potential becomes small by the influence of the potential change at the time of outputting the high-luminosity negative potential to the adjacent signal line S4 when displaying the vertical direction positions g5, g7 and g9.

That is, the luminosity of the pixels PX becomes dark. In the pixel electrodes PE (Red) of the vertical direction position g1 connected with the signal line S4, the absolute value of the potential becomes small when displaying the vertical direction positions g4-g9 due to the influence by the potential change of the signal line S4 every row line and the potential change of the adjacent signal line S5 in the g4 and g10. That is, in the selected periods g4, g6 and g8, the liquid crystal impressing voltage reduces. Accordingly, the luminosity of the pixels PX becomes dark. In the pixel electrode PE (Green) of the vertical direction position g1 connected with the signal line S5, while the high-luminosity positive potential of the signal line S5 and the high-luminosity negative potential of the adjacent signal line S6 interacts each other, negative potential becomes large by the influence of the signal line S5 since CP1 is larger than CP2. That is, the luminosity of the pixels becomes high. It is possible to obtain the luminosity change of each pixel PX applying the same analysis to the signal lines S7, S8 . . . .

Next, the pixels PX in the vertical direction position g2 are explained. In the pixel electrodes PE (Blue) in the vertical direction position g2 connected with the signal line S4, the absolute value of the potential becomes large by the influence of the potential change at the time of outputting the high-luminosity negative potential to the signal line S4 when displaying the vertical direction positions g5, g7 and g9. That is, the luminosity of the pixels PX becomes bright. In the pixel electrodes PE (Red) of the vertical direction position g2 connected with the signal line S5, the absolute value of the potential becomes large when displaying the vertical direction positions g4-g9 due to the influence by the potential change of the signal line S4 every row line and the potential change of the signal line S5 in the vertical directions g4 and g10. In the selected periods g4, g6, and g8, the liquid crystal impressing voltage increases. That is, the luminosity of this pixel PX becomes bright. In the pixel electrodes PE (Green) of the vertical direction position g2 connected with the signal line S6, while the high-luminosity negative potential of the signal line S6 and the high-luminosity positive potential of the adjacent signal line S5 interact each other, negative potential becomes large by the influence of the signal line S6 since CP1 is larger than CP2. The luminosity of the pixels becomes large. It is possible to obtain the luminosity change of each pixels PX applying the same analysis to the signal lines S7, S8 . . . .

Regarding the pixels PX in the vertical direction position g3, the same analysis as the pixels PX in the vertical direction position g1 can be made.

In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 15A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes connected with the lines g1-g3. Therefore, if above-mentioned analysis is applied, the luminosity of the vertical direction positions g10-g13 becomes in a opposite state to the luminosity of the vertical direction positions g1-g3.

Figure 16:
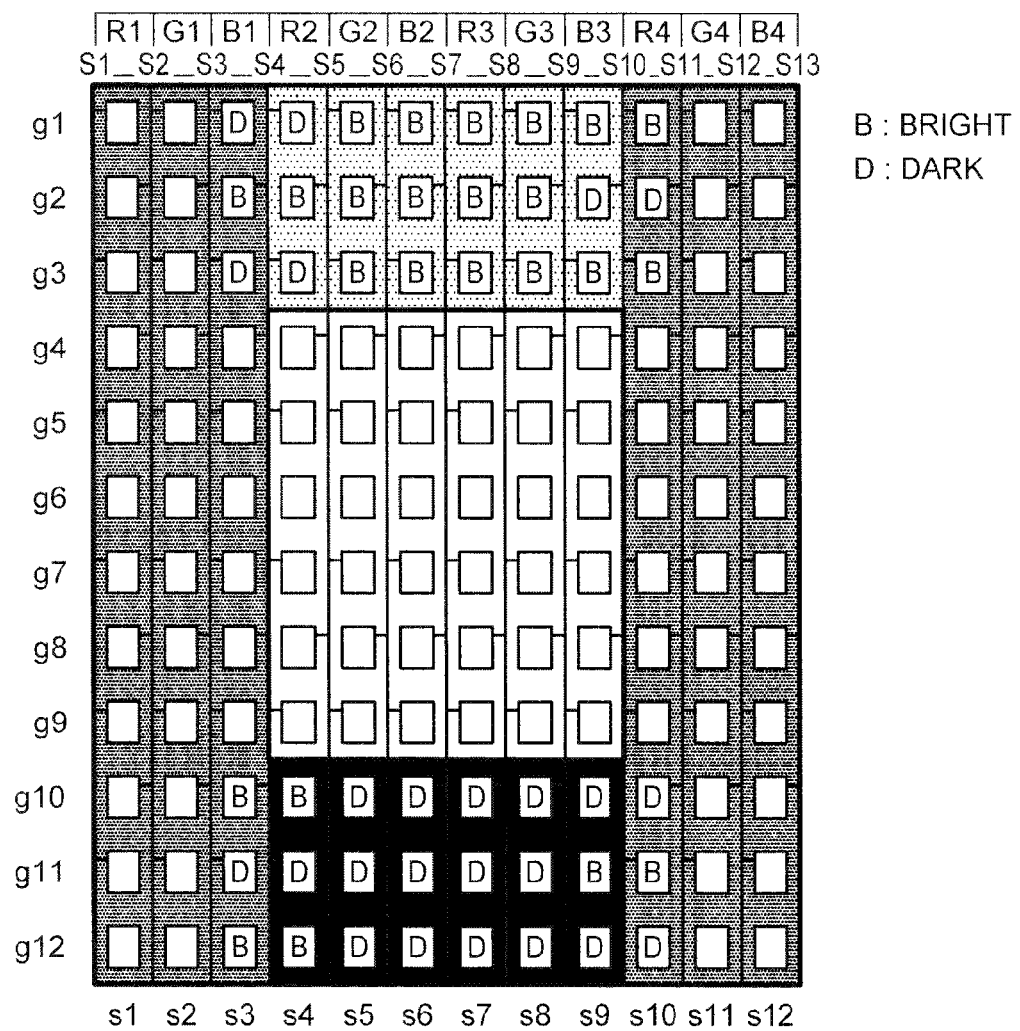
FIG. 16 is a figure showing the display state when the parasitic capacitance $Cp1$ is larger than the parasitic capacitance $Cp2$ in the pseudo-dot inversion driving system according to the embodiment.

FIG. 16 is a figure showing the display state when the parasitic capacitance Cp1 is larger than the parasitic capacitance Cp2 in the pseudo-dot inversion driving system according to this embodiment.

As shown in FIG. 16, the display luminosity of the gray gradation of all the pixels sandwiching the window (lateral direction positions s4-s9) changes. Therefore, when parasitic capacitance Cp1 differs from Cp2 mutually (usually Cp1>Cp2), it turns out that the vertical cross talk occurs.

[Pseudo Dot-inversion Driving System: Color Window, Cp1=Cp2]

FIG. 17 is a figure showing the generation of the vertical cross when the parasitic capacitance Cp1 is equal to the parasitic capacitance Cp2 in the pseudo-dot inversion driving system in the case of displaying a color window according to this embodiment.

Figures 17A, 17B:
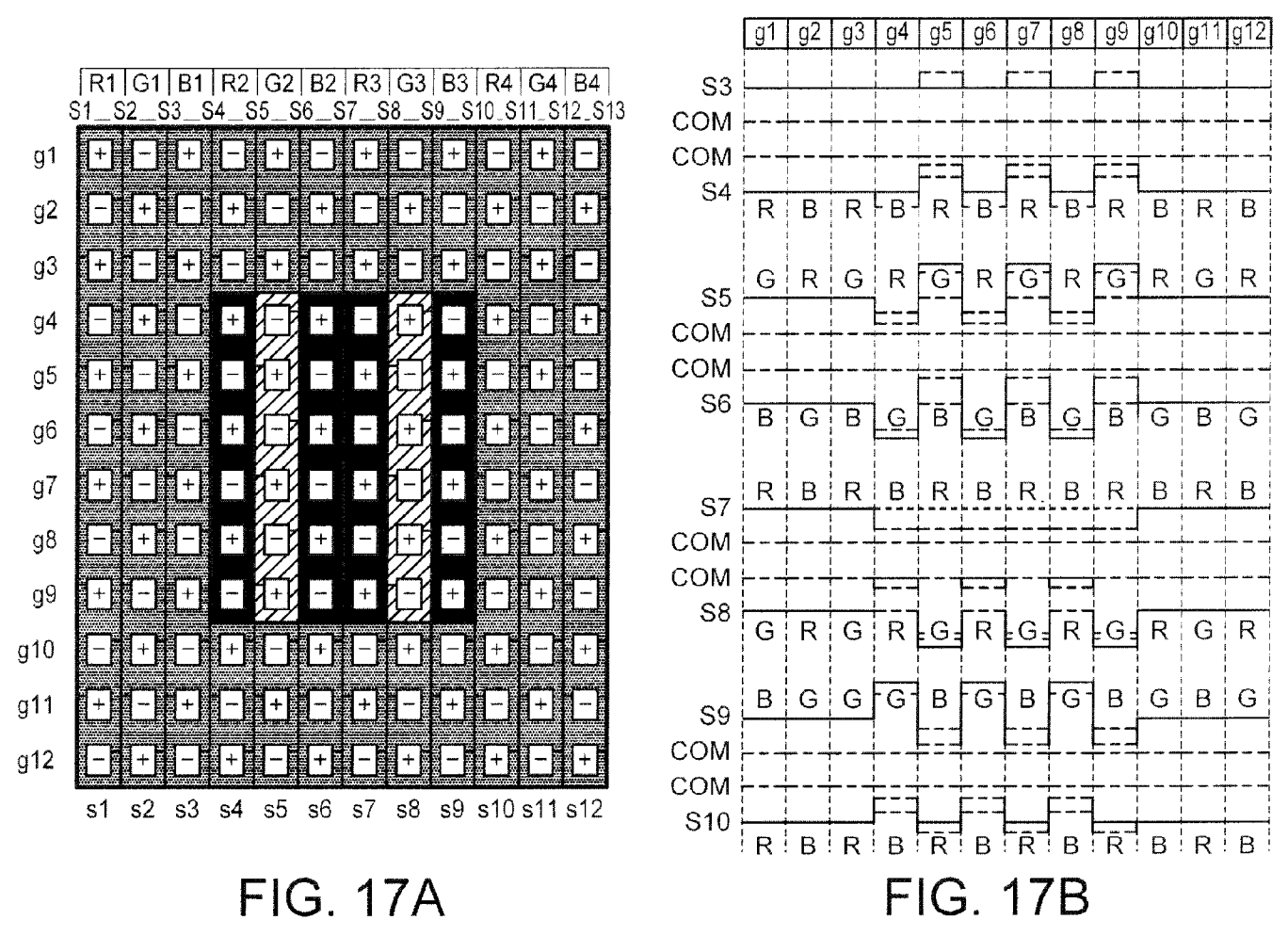

FIGS. 17A and 17B are figures schematically showing the polarity of the pixel PX in one frame. The background image is displayed with the luminosity of gray gradation, and the picture in the window is displayed in green color. Therefore, the green signal with predetermined gradation is supplied to the signal lines S5 and S8 for supplying the green signal to the vertical direction position g5, g7 and g9, and the signal lines S6 and S9 for supplying the green signal to the vertical direction positions g4, g6 and g8. On the other hand, the signal potential of the signal line S which supplies red signal and blue signal is set to the potential corresponding to black color, i.e., approximately "0"V in the illustrated example. In addition, the polarity is reversed in the following frame.

FIG. 17B is a time chart schematically showing potential change of the signal line S and the pixel electrode PE in the case of image signal writing.

In the vertical direction positions g1-g3, since the gray gradation is displayed, the value (absolute value) of the signal potential outputted to the signal lines S3-S10 is the same. When displaying the vertical direction positions g5, g7 and g9, "0"V is applied to the signal line S4, and positive potential is supplied to the signal line S3.

First, the pixels PX of the vertical direction position g1 are explained. In the pixel electrodes PE (Blue) of the vertical direction position g1 connected with the signal line S3, the potential increases due to the influence by increasing potential of the adjacent signal line S4 from "negative" voltage to "0" at the timing for displaying the vertical direction position g5, g7 and g9. That is, the luminosity of the pixels PX becomes bright. In the pixel electrodes PE (Red) of the vertical direction position g1 connected with the signal line S4, the absolute value of the potential decreases due to the influence by increasing potential of the adjacent signal line S4 from "negative" potential to "0" volt and the influence by the potential of the adjacent signal line S5 at the timing for displaying the vertical direction position g5, g7 and g9.

Practically, if the potential of the negative gray gradation image signal supplied to the signal line S4 and the pixel electrode PE (Red) located in the vertical direction position g1 from the outside is presumed as −Va (intermediate potential between the black potential and the white potential), since there is no potential change of the signal lines S4 and S5 sandwiching the pixel electrodes PE in the periods g1-g3, the pixel electrodes PE hold potential −Va. The pixel potential changes under the influence by the signal lines S4 and S5 at the period g4-g9 in the window display period. Here, influence which the pixel electrodes PE receive when the signal line S4 with the negative voltage output changes from the gray gradation potential −Va to the black potential is referred to "+1", and influence which the pixel electrodes PE receive when the signal line S4 changes from the black potential to the gray gradation potential −Va is referred to "−1". Furthermore, influence which the pixel electrodes PE receive when the signal line S5 with the positive voltage output changes from the gray gradation potential −Va to the black potential is referred to "−1", the influence which the pixel electrodes PE receive when the signal line S5 changes from the black potential to the high gradation potential is referred to "+2", the influence which the pixel electrodes PE receive when the signal line S5 changes from the high gradation potential to the black potential is referred to "−2", and the influence which the pixel electrodes PE receive when the signal line S5 changes from the black potential to the gray gradation potential −Va is referred to "+1". The potential in the period during g1-g3 is the gray gradation potential −Va.

First, in the period g4, the potential of the signal line S4 does not change. However, since the signal line S5 changes from Va to the black potential, the holding potential of the pixel electrode PE in the period g4 is set to "−Va−1". Next, since the signal line S4 changes by (+1) from −Va to the black potential in the period g5, and the signal line S5 changes by (+2) from the black potential to the high gradation potential, the change amount which the pixel PX receives from the signal lines S4 and S5 in this period becomes "+3". Accordingly, the potential changes by "+3" from the holding potential "−Va−1" in the last period g4, and the holding potential of the pixel electrode PE in the period g5 is set to "−Va+2." Next, the signal line S4 changes by (−1) from the black potential to −Va in the period g6, and the signal line S5 changes (−2) from the high gradation potential to the black potential. Accordingly, since the change amount which the pixel electrode PE receives from the signal lines S4 and S5 in this period becomes "−3", the holding potential "−Va+2" in the last period g5 changes by "−3" and the holding potential of the pixel electrode PE in the period g6 becomes "−Va−1."

Next, since the signal line S4 changes by (+1) from −Va to the black potential, and the signal line S5 changes (+2) from the black potential to the high gradation potential in the period g7, the change amount which the pixel electrodes receive from the signal lines S4 and S5 becomes "+3". Accordingly, the holding potential "−Va−1" in the last period g6 changes "+3", and the holding potential of the pixel electrodes PE in the period g7 is set to "−Va+2." Next, since the signal line S4 changes by (−1) from the black potential to −Va in the period g8 and the signal line S5 changes by (−2) from the high gradation potential to the black potential, the change amount which the pixel electrodes receive from the signal lines S4 and S5 in this period becomes "−3". Furthermore, the holding potential "−Va+2" in the last period g7 changes by "−3", and the holding potential of the pixel electrodes PE in the period g8 becomes "−Va−1".

Next, since the signal line S4 changes by (+1) from −Va to the black potential and the line S5 changes (+2) from the black potential to the high gradation potential in the period g9, the change amount which the pixel electrodes PE receive from the signal lines S4 and S5 becomes "+3". Accordingly, the holding potential "−Va−1" in the last period g8 changes by "+3" and the holding potential of the pixel electrodes PE in the period g9 is set to "−Va+2." Finally, since the signal line S4 changes by (−1) from the black potential to −Va, and the signal line S5 changes by (−1) from the high gradation potential to the gray gradation potential Va in the period g10, the change amount which the pixel electrodes PE receive from the signal lines S4 and S5 in this period becomes "−2". Furthermore, the holding potential "−Va+2" in the last period g9 changes by "−2", and the holding potential of the pixel electrode PE in the period g10 returns to "−Va." which is the potential before displaying the window.

As mentioned above, if the holding potential of the pixel electrodes PE in the window display period is summarized, the holding potential become g4="−Va−1", g5="−Va+2", g6="−Va−1", g7="−Va+2", g8="−Va−1", and g9="−Va+2". The average holding potential of the above-mentioned pixel electrodes PE in the window display period g4-g9 becomes "−Va+1/2", and rises with respect to the supplied negative image signal potential−Va. That is, the absolute value of the pixel potential decreases, and the liquid crystal impressing voltage also decreases. The luminosity of this pixel PX becomes dark.

In the pixel electrode PE (Green) connected with the signal line S5 in the vertical direction position g1, the pixel potential repeats to increase and decrease by the same principle as above-mentioned analysis due to potential change of the signal line S5 and the adjacent signal line S6 in the vertical direction positions g4-g10. However, since under the condition of Cp1=Cp2, the average value of the increase and decrease in this period becomes equal to the image signal potential supplied from the outside, the average holding potential of the pixel electrode PE by the signal lines S5 and S6 does not change. That is, there is no change of luminosity in this pixel PX.

It is possible to obtain the average luminosity of each pixel PX applying the same analysis to the signal lines S7, S8, . . . .

Next, the pixels PX of the vertical direction position g2 are explained. In the pixel electrodes PE (Blue) of the vertical direction position g2 connected with the signal line S4, the absolute value of the potential becomes small when displaying the vertical direction positions g5, g7 and g9 under the influence by potential change from negative potential to "0" by the signal line S4. That is, the luminosity of this pixel PX becomes dark. In the pixel electrodes PE (Red) in the vertical direction position g2 connected with the signal line S5, the potential of the signal line S5 changes from positive potential to "0" volt at the timing of supplying the black potential in the vertical positions g4, g6 and g8, and also changes from "0" volt to positive high gradation potential at the timing of displaying high gradation in the vertical positions g5, g7 and g9. The potential of the adjacent signal line S4 increases from negative potential to "0" volt in the vertical positions g5, g7 and g9. Accordingly, the average holding potential of the pixel electrodes PE in the window displaying period g4-g9 more increases than the supplied positive gray gradation voltage under the influence of the potential change of the signal line S5 and the adjacent signal line S4. That is, the luminosity of this pixel PX becomes bright.

In the pixel electrodes PE (Green) connected with the signal line S6 in the vertical direction position g2, the pixel potential repeats to increase and decrease by the same principle as above-mentioned analysis due to potential change of the signal lines S5 and S6 in the vertical direction positions g4-g10. However, since under the condition of Cp1=Cp2, the average value of the change of the pixel potential in this period becomes equal to the image signal potential supplied from the outside, the average holding potential of the pixel electrodes PE does not change. That is, there is no change of luminosity in the pixels PX by the signal lines S5 and S6.

It is possible to obtain the average luminosity of each pixel PX applying the same analysis to the signal lines S7, S8, . . . .

Regarding the pixels PX in the vertical direction position g3, the same argument as the pixels PX in the vertical direction position g1 can be made.

In the pixel electrodes PE connected with the vertical direction positions g10-g12, the pixel electrodes PE are affected by the signal line potential change at the time of the window display, i.e., the timing for writing to the line g4 in a following frame in which full screen polarities are inverted from the polarities shown in FIG. 17A. Therefore, potential change direction of the signal lines also becomes opposite to the potential change direction of the signal lines at the time of potential change of the pixel electrodes PE connected with the above-mentioned lines g1-g3 because the polarity is reversed. That is, the potential change direction of the pixel electrodes PE affected by the signal line potential change also turns into opposite to the potential change direction of the pixel electrodes connected with the lines g1-g3.

Figure 18:
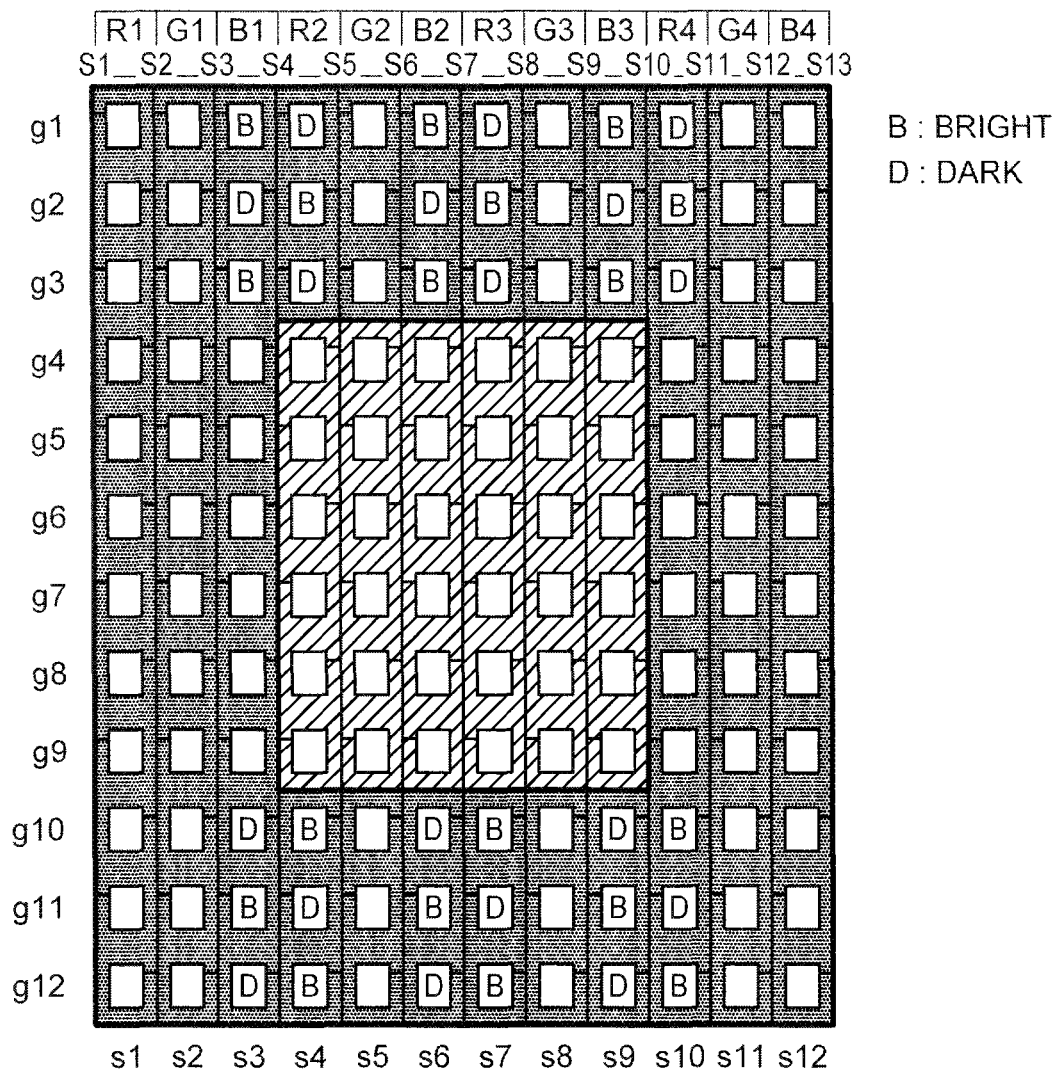
FIG. 18 is a figure showing the display state in a case of displaying a green window in the pseudo-dot inversion driving system according to the embodiment.

FIG. 18 is a figure showing the display state in a case of displaying a green window in the pseudo-dot inversion driving system according to this embodiment.

As shown in FIG. 18, display change occurs in the pixels sandwiching the window (lateral direction positions s4-s9). That is, in the upper portion of the window (vertical direction positions g1-g3) and in the lower portion of the window (vertical direction positions g10-g12), bright and dark pixels, and pixels without change are mixed. The bright and dark pixels are exchanged in the odd row lines and even row lines. Moreover, in the case of CP1=CP2, the average luminosity of the bright and dark pixels becomes equal to the luminosity of the gray gradation pixels which are formed outside the window and the pixels without change. On the other hand, when human recognizes a picture, the picture is recognized by the average luminosity of a plurality of pixels, not by bright and dark of each pixel. In the case of CP1=Cp2, since average value of the bright and dark in the window equals to gray gradation luminosity of the pixels other than the window, and bright and dark pixels are arranged by turns in the odd and even row lines, the bright and dark are canceled, and the generation of the cross talk is not sighted.

[Pseudo-dot Inversion Driving System: Color Window, Cp1≠Cp2]

Next, the pseudo-dot inversion driving system according to this embodiment is explained in case of displaying the color window and Cp1≠Cp2.

Although the relation between the bright pixel and dark pixels explained in FIG. 18 similarly occurs in a case of parasitic capacitance Cp1≠Cp2, since the average luminosity of bright and dark is strongly affected by the change of the signal line or adjacent signal line, difference in the luminosity may arise between the average luminosity of the bright and the dark and the gray gradation luminosity in the region which does not form the window. Accordingly, the difference is sighted as the cross talk. However, since bright and dark are exchanged in the odd row lines and even row lines unlike the column inversion driving system, the degree of the cross talk is improved.

Figure 19A:
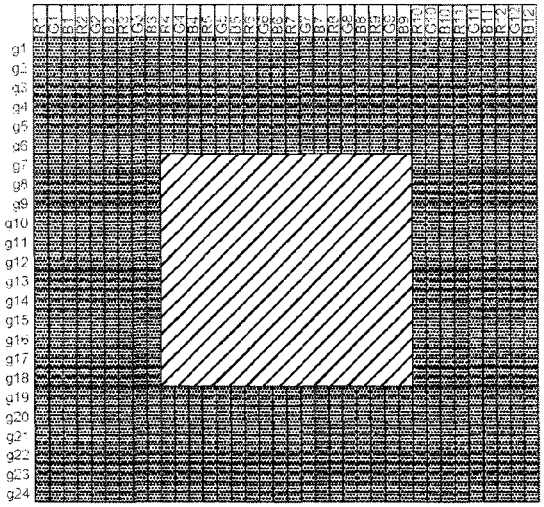
FIGS. 19A, 19B and 19C are figures schematically showing pixel potential change in the case of displaying the color window in the column inversion driving system and the pseudo-dot inversion driving system according to the embodiment.

FIG. 19 is a figure schematically showing pixel potential change in the case of displaying the color window in the column inversion driving system and the pseudo-dot inversion driving system according to this embodiment, FIG. 19A shows a picture in which a green color window is displayed on the background of gray gradation.

Figure 19B:
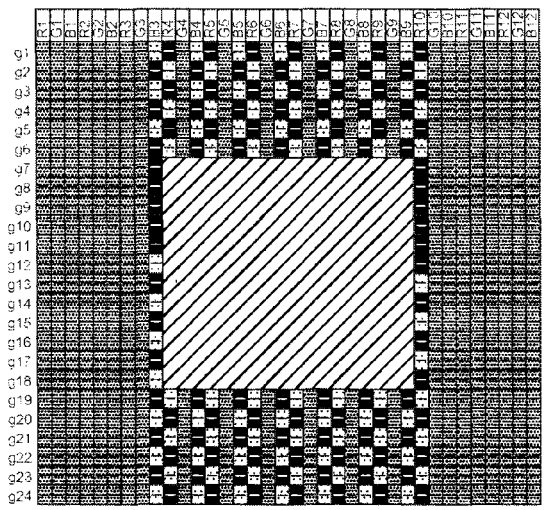
Figure 19C:
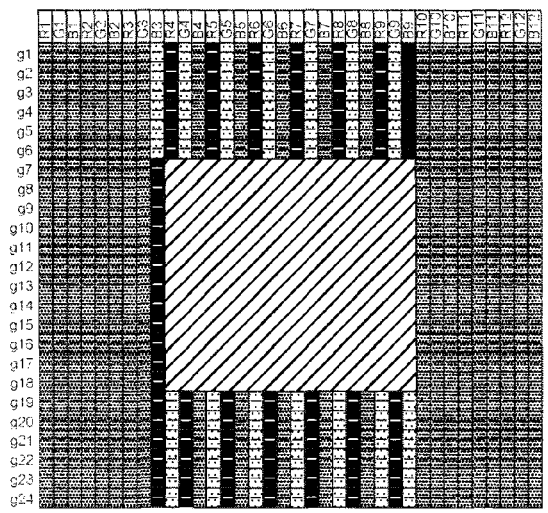

FIG. 19C shows a picture at the time of displaying the green color window on the background of gray gradation in the column inversion driving system. In the column inversion driving system, the cross talk is generated so that the picture turns slightly to green color in the upper portion of the window, and that the picture turns slightly to purple color in the lower portion of the color window with regardless of the relation between Cp1 and Cp2.

FIG. 19B shows the picture at the time of displaying the green color window on the background of gray gradation in the pseudo-dot inversion driving system. Bright and dark portions occur in the pixels in the upper portion and the lower portion of the window like the column inversion driving system. However, in the case of (1) Cp1=Cp2, since the bright and dark portions are repeated by turns in the odd row lines and even row lines, the light and dark portions are canceled and not sighted. That is, it is not sighted that the cross talk occurs. On the other hand, in the case of (2) Cp1≠Cp2, although the bright and dark occur by turns in the odd row lines and even row lines like the case of Cp1=Cp2, since difference in the luminosity is generated between the average luminosity of the light and dark portions and the background gray gradation luminosity outside the window. Accordingly, bright and dark portions are not canceled, and the cross talk occurs.

The analyzed result about the generation of the cross talk in the column inversion driving system and the pseudo-dot inversion driving system explained above is as follows.

In order to improve the vertical cross talk due to the coupling between the pixel electrode and the signal line, which is a problem in the column inversion driving system, adoption of the pseudo-dot inversion driving system is effective. However, also in the pseudo-dot inversion driving system, when the coupling capacitance (Cp1, Cp2) between the pixel electrode and the signal line is not balanced, the vertical cross talk occurs.

According to the above-mentioned analyzed result, technique to make small the difference between the parasitic capacitance (Cp1) generated between the left signal line and the pixel electrode, and the parasitic capacitance (Cp2) generated between the right signal line (adjacent signal line) and the pixel electrode is adopted as a measure for reducing the vertical cross talk in the pseudo-dot inversion driving system.

For example, as shown in FIG. 4B, difference arises between parasitic capacitances because the parasitic capacitance Cp1' occurs between the right signal line S and the semiconductor layer. Accordingly, the parasitic capacitance Cp1 (Cp1=Cp1$p$+Cp1') on the left signal line S side is made larger than the parasitic capacitance Cp2 (Cp2=Cp2$p$) on the right signal line S' side.

Figure 20:
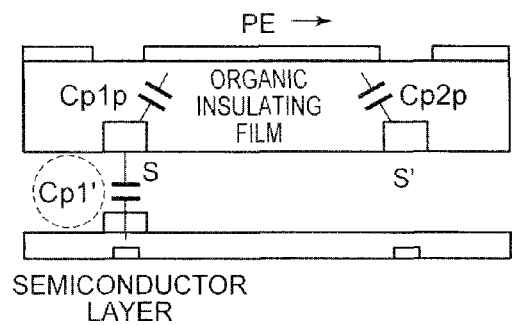
FIG. 20 is a figure showing a method for reducing the vertical cross talk in the pseudo-dot inversion driving system according to the embodiment.

FIG. 20 is a figure showing a method for reducing the vertical cross talk in the pseudo-dot inversion driving system according to this embodiment. As shown in FIG. 20, the pixel electrode PE is moved to the right signal line side (shift). Then, the distance between the left signal line S and the pixel electrode PE is set so that the distance is made longer than the distance between the right signal line S' and the pixel electrode PE. As a result, the value of the parasitic capacitance Cp1$p$ becomes small when the left signal line S and the pixel electrode PE are more apart from each other. On the other hand, when the right signal line S' and the pixel electrode PE more closes each other, the value of the parasitic capacitance Cp2$p$ becomes large. As a result, the difference between Cp1$p$+Cp1' and Cp2$p$ can be made small.

Figures 21A, 21B:
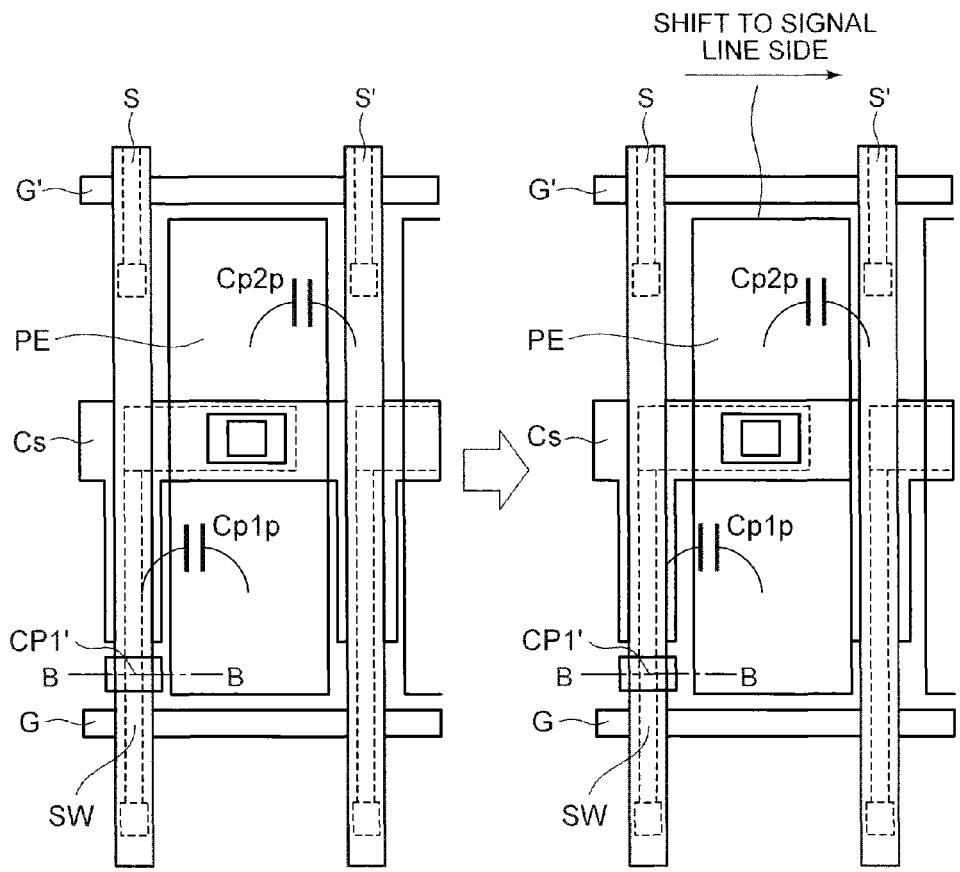
FIG. 21A is a figure showing the structure of the pixel of prior art.
FIG. 21B is a figure showing the structure of the pixel according to the embodiment.

FIG. 21A shows the structure of the pixel of the prior art. In the structure of the prior art pixel, the distances between the left signal line S and the pixel electrode PE, and between the right signal line S' and the pixel electrode PE are made equal. Therefore, the parasitic capacitance Cp1$p$ between the left signal line S and the pixel electrode through an organic insulating film becomes equal to Cp2$p$ in many cases. On the other hand, parasitic capacitance increases by the parasitic capacitance Cp1' surrounded with a rectangular line in which a cross-sectional line B-B crosses, i.e., the capacitance between the semiconductor layer holding drain potential of the switching element SW and the left signal line S.

Then, as shown in FIG. 21B, the pixel electrode PE is moved to the right hand. At this time, the relation between Cp1$p$ and Cp2$p$ through the organic insulating film becomes Cp1$p$<Cp2$p$. Thereby, the unbalance of the parasitic capacitance between the left signal line side parasitic capacitance Cp1=Cp1$p$+Cp1' and the right signal line side Cp2=Cp2$p$ is cancelable. In addition, it is noted that there is limitation in the shift amount of the pixel electrode PE. That is, the pixel electrode PE can not be shifted in the adjacent pixel domain beyond the right signal line S'. This is for preventing the generation of mixed colors.

Figure 22:
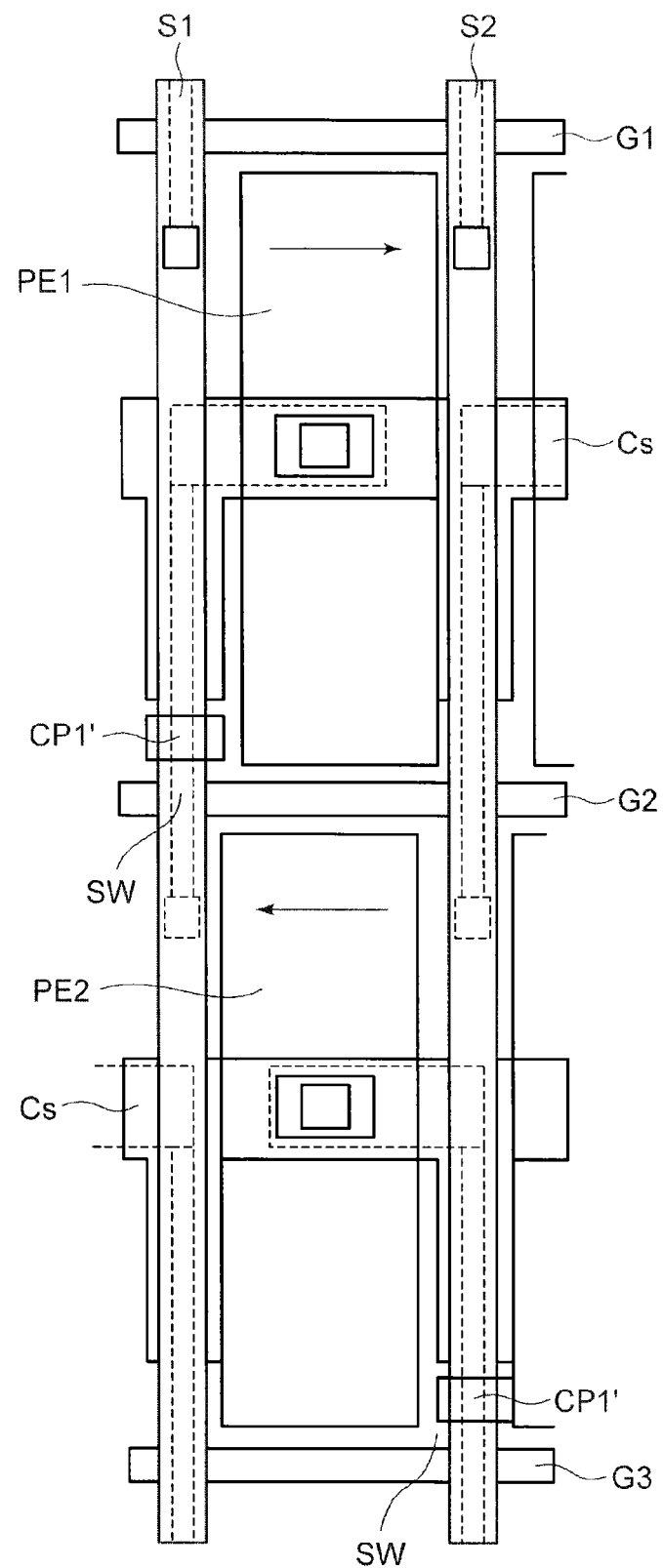
FIG. 22 is a figure showing the structure of the pixel in the pseudo-dot driving system according to a first embodiment.

FIG. 22 is a figure showing the structure of the pixel in the pseudo-dot inversion driving system according to a first embodiment. In the pixel structure which realizes the pseudo-dot inversion driving system, the signal lines connected with the pixel electrodes PE differ every row line as shown in FIG. 12. Therefore, the direction to which the pixel electrode is shifted is different every row line.

The pixel electrode PE includes a first pixel electrode PE1 surrounded with first and second gate lines G1 and G2 and first and second signal lines S1 and S2, and a second pixel electrode PE2 surrounded with second and third gate lines G2 and G3 and the first and second signal lines S1 and S2. The first and second signal lines S1 and S2 extend in a straight line shape. The first pixel electrode PE1 is arranged so that the distance between the first pixel electrode PE1 and the first signal line S1 is longer than the distance between the first pixel electrode PE1 and the second signal line S2. The second pixel electrode PE2 is arranged so that the distance between the second pixel electrode PE2 and the first signal line S1 is shorter than the distance between the second pixel electrode PE2 and the second signal line S2.

Figure 23:
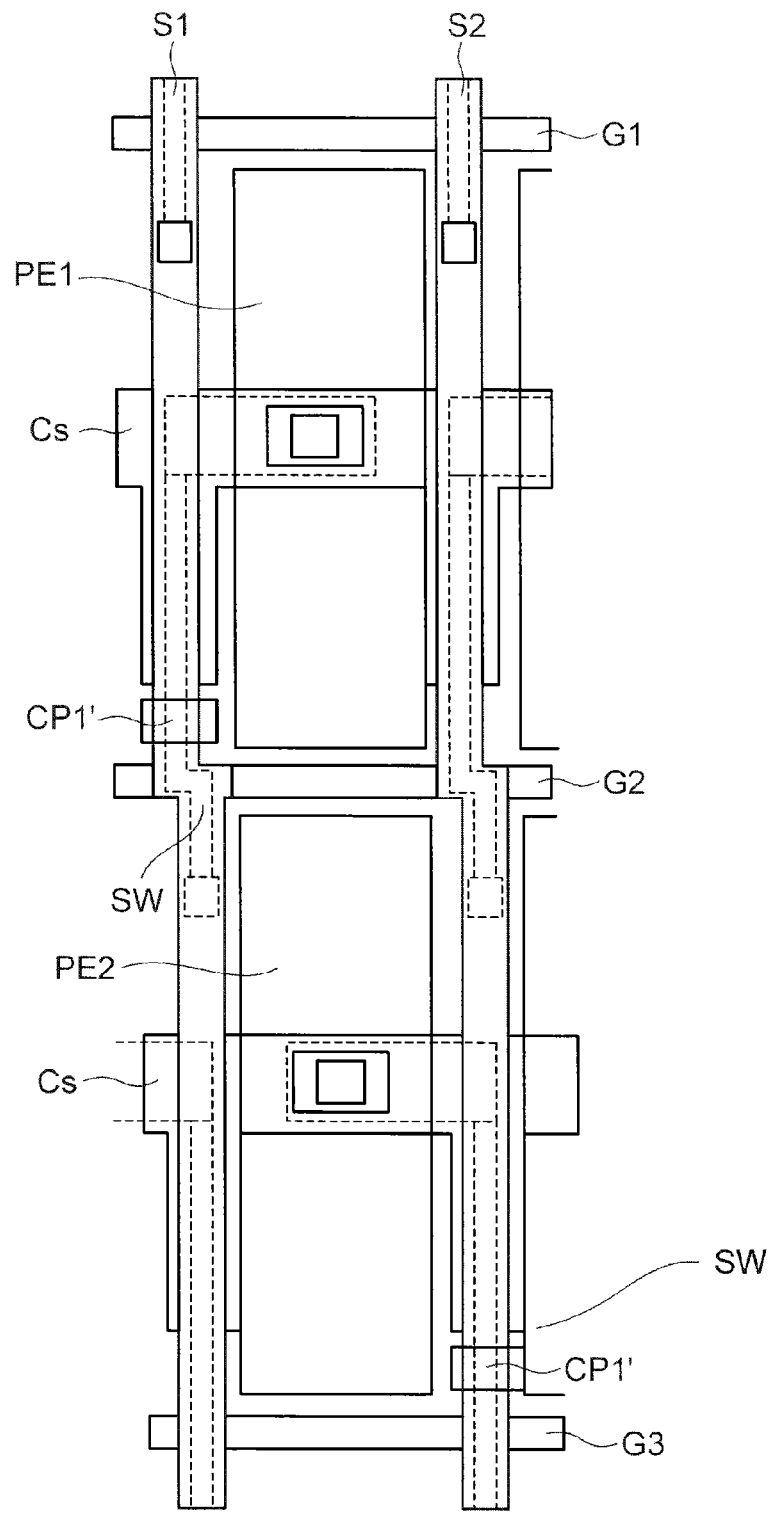
FIG. 23 is a figure showing the structure of the pixel in the pseudo-dot driving system according to a second embodiment.

FIG. 23 shows a second embodiment. In this embodiment, the first and second pixel electrodes PE1 and PE2 are aligned in a straight line shape in the column direction. Instead, the first and second signal lines are arranged in a zig-zag shape. In a first row line of the pixels, the first and second signal lines S1 and S2 are shifted to left hand side. In the second row line of the pixels, the first and second signal lines S1 and S2 are shifted to the right hand side. In this pattern, same effect as the first embodiment is obtained. The first and second signal lines S1 and S2 extend in the column direction in a staggered shape crooked on the second gate line G2. The first pixel electrode PE1 is arranged so that the shortest distance between the first pixel electrode PE1 and the first signal line S1 is longer than the distance between the first pixel electrode PE1 and the second signal line S2. The second pixel electrode PE2 is arranged so that the distance between the second pixel electrode PE2 and the first signal line S1 is shorter than the distance between the second pixel electrode PE2 and the second signal line S2. The first and second pixel electrodes PE1 and PE2 are arranged aligned with the column direction without shifting in the row direction each other.

In the above-mentioned plan figure, the pixel electrode PE may intersects only one end of the adjacent signal line S without extending to adjacent pixel beyond the other end. Thereby, generation of mixed colors can be prevented.

In addition, in the above explanation, the signal line and the gate line include the source electrode and the gate electrode, respectively.

In addition, the pixel structure applied to the embodiments is not limited to the above-mentioned structure, but can be applied to all the pixel structures which have parasitic capacitance between the signal line and the pixel electrode. For example, the embodiment is applicable to the pixel in VA mode, TN (Twisted Nematic) mode, and homogeneous mode. Moreover, the embodiment is not restricted to vertical alignment (VA) mode, but applicable to the pixel structure using FFS (Fringe Field Switching) mode, if the pixel is formed so that the common electrode is arranged on the pixel electrode.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device using a pseudo-dot inversion driving system comprising:
    an array substrate, including:
        an insulating substrate,
        a plurality of pixels arranged in a matrix of row and column, each pixel including a pixel electrode,
        a first gate line and a second gate line extending in the row direction,
        a first signal line and a second signal line extending in the column direction,
        a switching element connected with the first and second signal lines,
        a semiconductor layer formed on the insulating substrate under the first signal line through an insulating film and connected with the switching element, and
    a counter substrate facing the array substrate; and
    a liquid crystal layer held between the array substrate and the counter substrate; wherein
    the pixel electrode is formed on the insulating substrate through an insulating film and arranged in a region surrounded with the first and second gate lines and the first and second signal lines,
    the pixel electrode is electrically connected with the first signal line through the switching element,
    a first parasitic capacitance is formed between the pixel electrode and the first signal line, a second parasitic capacitance is formed between the first signal line and the semiconductor layer, and a third parasitic capacitance is formed between the pixel electrode and the second signal line, and
    a distance between the first signal line and the pixel electrode is set to be longer than a distance between the pixel electrode and the second signal line so that a sum of the first parasitic capacitance and the second parasitic capacitance is substantially the same as the third parasitic capacitance.

2. The liquid crystal display device using a pseudo-dot inversion driving system according to claim 1, wherein the semiconductor layer is a drain region of the switching element.

3. The liquid crystal display device using a pseudo-dot inversion driving system according to claim 1, wherein an insulating film is interposed between the signal lines and the semiconductor layer.

4. The liquid crystal display device using a pseudo-dot inversion driving system according to claim 1, wherein the first and second pixel electrodes are formed substantially in a rectangular shape.

* * * * *